US011187823B2

(12) United States Patent
Ashe et al.

(10) Patent No.: US 11,187,823 B2
(45) Date of Patent: Nov. 30, 2021

(54) CORRECTING DISTORTIONS

(71) Applicant: Ascension Technology Corporation, Shelburne, VT (US)

(72) Inventors: Westley S. Ashe, Hinesburg, VT (US); Kenji Fujioka, Burlington, VT (US)

(73) Assignee: Ascension Technology Corporation, Shelburne, VT (US)

( * ) Notice: Subject to any disclaimer, the term of this patent is extended or adjusted under 35 U.S.C. 154(b) by 78 days.

(21) Appl. No.: 16/838,878

(22) Filed: Apr. 2, 2020

(65) Prior Publication Data
US 2020/0319361 A1 Oct. 8, 2020

Related U.S. Application Data

(60) Provisional application No. 62/828,297, filed on Apr. 2, 2019.

(51) Int. Cl.
*G01V 3/10* (2006.01)
*G01V 3/38* (2006.01)
*G01V 3/08* (2006.01)

(52) U.S. Cl.
CPC .............. *G01V 3/10* (2013.01); *G01V 3/087* (2013.01); *G01V 3/38* (2013.01)

(58) Field of Classification Search
USPC .................. 324/200, 202; 702/94, 150–156; 600/409, 424
See application file for complete search history.

(56) References Cited

U.S. PATENT DOCUMENTS

| 5,615,132 A * | 3/1997 | Horton | G06F 3/011 340/988 |
| 6,400,139 B1 * | 6/2002 | Khalfin | G01S 1/024 324/207.12 |
| 6,427,079 B1 * | 7/2002 | Schneider | A61B 5/06 324/244 |

(Continued)

FOREIGN PATENT DOCUMENTS

| AU | 2017257549 A1 * | 11/2018 | .......... G01S 5/0284 |
| CA | 3077279 A1 * | 5/2020 | ............. G06F 3/012 |

(Continued)

*Primary Examiner* — Patrick Assouad
*Assistant Examiner* — Sean Curtis
(74) *Attorney, Agent, or Firm* — Fish & Richardson P.C.

(57) ABSTRACT

A system comprising: a magnetic transmitter configured to generate magnetic fields; a magnetic sensor configured to generate signals based on characteristics of the magnetic fields; and one or more computer systems configured to: cause the magnetic transmitter to generate a first plurality of magnetic fields at a first frequency; receive a first plurality of signals from the magnetic sensor; determine data indicative of a position and orientation of the magnetic sensor at a first position of the magnetic sensor; determine a distortion term that corresponds to a first position of the magnetic sensor; cause the magnetic transmitter to generate a third plurality of magnetic fields at the first frequency; receive a third plurality of signals from the magnetic sensor; and determine a second position and orientation of the magnetic sensor relative to the magnetic transmitter, wherein the first frequency is greater than the second frequency.

20 Claims, 5 Drawing Sheets

(56) References Cited

U.S. PATENT DOCUMENTS

| | | | | |
|---|---|---|---|---|
| 6,624,626 B2* | 9/2003 | Khalfin | ................... | G01S 1/024 324/207.12 |
| 6,762,600 B2* | 7/2004 | Khalfin | ................... | G01S 1/024 324/207.17 |
| 7,158,754 B2* | 1/2007 | Anderson | ............... | A61B 5/062 455/41.1 |
| 7,321,228 B2* | 1/2008 | Govari | ................... | A61B 5/062 324/207.17 |
| 7,542,869 B2* | 6/2009 | Gandelsman | ......... | G01S 5/0252 702/150 |
| 7,873,491 B2* | 1/2011 | Higgins | ................. | G01B 7/004 702/150 |
| 7,902,817 B2* | 3/2011 | Anderson | ................ | G01B 7/30 324/207.17 |
| 7,911,202 B2* | 3/2011 | Anderson | ................ | H01F 5/003 324/207.15 |
| 8,049,617 B2* | 11/2011 | Culpepper | ............ | G01S 5/0009 340/539.13 |
| 8,082,020 B2* | 12/2011 | Bar-Tal | ................. | G01V 3/081 600/424 |
| 8,138,918 B2* | 3/2012 | Habib | ................ | G08B 13/2491 340/552 |
| 8,228,028 B2* | 7/2012 | Schneider | ................ | A61B 5/06 320/108 |
| 8,532,340 B2* | 9/2013 | Kruglick | ................... | G06T 7/40 382/108 |
| 9,002,437 B2* | 4/2015 | Yaroshenko | ........... | A61B 5/062 600/424 |
| 9,354,445 B1* | 5/2016 | Weaver | ................... | G06F 3/013 |
| 9,495,801 B2* | 11/2016 | Ebstyne | ................... | G06F 3/011 |
| 9,522,045 B2* | 12/2016 | Ramachandran | ...... | A61B 6/547 |
| 9,636,188 B2* | 5/2017 | Gattani | ................... | A61B 90/37 |
| 9,754,419 B2* | 9/2017 | Petrovskaya | ...... | G06K 9/00671 |
| 9,891,291 B2* | 2/2018 | Sheinker | ................ | G01R 33/02 |
| 10,231,614 B2* | 3/2019 | Krueger | ................ | A61B 5/163 |
| 10,261,162 B2* | 4/2019 | Bucknor | ................ | H01H 9/0228 |
| 10,378,921 B2* | 8/2019 | Pedrotti | ................ | G01S 5/00 |
| 10,402,649 B2* | 9/2019 | Rabinovich | ............ | G06F 3/011 |
| 10,439,444 B2* | 10/2019 | Wight | ................... | H02J 50/40 |
| 10,495,718 B2* | 12/2019 | Bucknor | ................ | G06F 3/012 |
| 10,534,454 B2* | 1/2020 | Stafford | ................ | A63F 13/21 |
| 10,642,560 B2* | 5/2020 | Hill | ................... | G01S 5/0257 |
| 10,650,552 B2* | 5/2020 | Woods | ................... | G06T 7/74 |
| 10,733,447 B2* | 8/2020 | Rabinovich | ............ | G06N 3/006 |
| 10,740,502 B2* | 8/2020 | Duff | ................... | G02B 27/0093 |
| 10,746,815 B2* | 8/2020 | Miller | ................... | G06F 30/20 |
| 10,746,819 B2* | 8/2020 | Chung | ................... | G06F 3/011 |
| 10,914,567 B2* | 2/2021 | Guo | ................... | G01B 7/30 |
| 10,916,064 B2* | 2/2021 | Wan | ................... | G01V 3/165 |
| 10,948,721 B2* | 3/2021 | Bucknor | ................ | G01S 1/70 |
| 10,996,742 B2* | 5/2021 | Connellan | ............ | G01S 11/16 |
| 11,016,305 B2* | 5/2021 | Wan | ................... | G02B 27/0172 |
| 2003/0016006 A1* | 1/2003 | Khalfin | ................... | A61B 5/062 324/207.17 |
| 2003/0201767 A1* | 10/2003 | Khalfin | ................... | G01V 3/08 324/207.17 |
| 2004/0090226 A1* | 5/2004 | Khalfin | ................... | G01S 5/02 324/207.17 |
| 2005/0107687 A1* | 5/2005 | Anderson | ............... | A61B 34/20 600/424 |
| 2007/0299623 A1* | 12/2007 | Gandelsman | ......... | G06F 3/0346 702/95 |
| 2008/0120061 A1* | 5/2008 | Higgins | ................. | G01B 7/004 702/150 |
| 2008/0238413 A1* | 10/2008 | Anderson | ................ | G01B 7/30 324/207.17 |
| 2009/0115406 A1* | 5/2009 | Anderson | ................ | A61B 34/20 324/207.17 |
| 2010/0082280 A1* | 4/2010 | Schneider | ................ | A61B 5/062 702/94 |
| 2010/0168556 A1* | 7/2010 | Shen | ................... | G01S 5/021 600/424 |
| 2011/0270083 A1* | 11/2011 | Shen | ................... | A61B 5/062 600/424 |
| 2012/0323111 A1* | 12/2012 | Jain | ................... | A61B 34/20 600/411 |
| 2013/0238270 A1* | 9/2013 | Khalfin | ................... | G05G 9/00 702/94 |
| 2014/0187915 A1* | 7/2014 | Yaroshenko | ............. | A61B 6/54 600/424 |
| 2014/0354300 A1* | 12/2014 | Ramachandran | ...... | G01R 23/00 324/654 |
| 2015/0285612 A1* | 10/2015 | Miles | ................... | G01V 3/12 702/150 |
| 2015/0305823 A1* | 10/2015 | Claus | ................... | A61B 34/20 600/424 |
| 2015/0317833 A1* | 11/2015 | Ebstyne | ............... | G02B 27/017 345/633 |
| 2016/0015292 A1* | 1/2016 | Lorraine | ................ | A61B 34/20 600/424 |
| 2016/0259404 A1* | 9/2016 | Woods | ................... | G06T 19/006 |
| 2017/0206712 A1* | 7/2017 | Petrovskaya | ........... | G06F 3/017 |
| 2017/0307891 A1* | 10/2017 | Bucknor | ............... | G01S 5/0284 |
| 2018/0008141 A1* | 1/2018 | Krueger | ................... | A61B 5/11 |
| 2018/0053056 A1* | 2/2018 | Rabinovich | ........... | A63F 13/211 |
| 2018/0168738 A1* | 6/2018 | Viswanathan | ......... | A61B 34/20 |
| 2018/0180682 A1* | 6/2018 | Miller | ................... | G06F 30/20 |
| 2018/0224508 A1* | 8/2018 | Kelly | ................... | A61B 5/062 |
| 2018/0239144 A1* | 8/2018 | Woods | ................... | A63F 13/212 |
| 2018/0300897 A1* | 10/2018 | Woods | ................... | G06F 3/0484 |
| 2019/0086482 A1* | 3/2019 | Chung | ................... | G06F 3/0346 |
| 2019/0113966 A1* | 4/2019 | Connellan | ............. | G06F 3/0346 |
| 2019/0242952 A1* | 8/2019 | Schneider | ................ | G06F 3/011 |
| 2019/0243472 A1* | 8/2019 | Stafford | ................ | G02B 27/017 |
| 2019/0257672 A1* | 8/2019 | Khalfin | ................... | G01S 3/00 |
| 2019/0265017 A1* | 8/2019 | Guo | ................... | G01R 33/07 |
| 2019/0340435 A1* | 11/2019 | Rabinovich | ........... | A63F 13/213 |
| 2019/0353745 A1* | 11/2019 | Zur | ................... | G01S 17/875 |
| 2020/0027275 A1* | 1/2020 | Wan | ................... | G01V 3/165 |
| 2020/0034501 A1* | 1/2020 | Duff | ................... | G01S 5/02 |
| 2020/0064431 A1* | 2/2020 | Bucknor | ................ | G01S 1/7038 |
| 2020/0226785 A1* | 7/2020 | Woods | ................... | G06T 7/277 |
| 2020/0319361 A1* | 10/2020 | Ashe | ................... | G01V 3/081 |
| 2020/0326544 A1* | 10/2020 | Wan | ................... | G06F 3/0346 |
| 2020/0334395 A1* | 10/2020 | Duff | ................... | G06T 19/006 |
| 2020/0334461 A1* | 10/2020 | Rabinovich | ........... | G06F 3/0346 |
| 2020/0368616 A1* | 11/2020 | Delamont | ................ | A63F 13/25 |
| 2020/0400856 A1* | 12/2020 | Castleman | ............... | G01V 3/38 |
| 2021/0073436 A1* | 3/2021 | Duff | ................... | G02B 27/0172 |
| 2021/0165217 A1* | 6/2021 | Bucknor | ................... | G01S 1/68 |
| 2021/0199959 A1* | 7/2021 | Koole | ................... | G06F 3/012 |
| 2021/0225085 A1* | 7/2021 | Wan | ................... | G06T 19/006 |

FOREIGN PATENT DOCUMENTS

| | | | | |
|---|---|---|---|---|
| CN | 108139803 A | * | 6/2018 | ........... H04N 13/361 |
| CN | 111742284 A | * | 10/2020 | ............ G01B 7/023 |
| CN | 111796665 A | * | 10/2020 | ............ G01V 3/081 |
| CN | 112513711 A | * | 3/2021 | ........... G06F 3/0346 |
| CN | 113132051 A | * | 7/2021 | ............ G06F 3/011 |
| CN | 113190111 A | * | 7/2021 | ........... H04N 13/332 |
| CN | 113227879 A | * | 8/2021 | ............ G01R 33/02 |
| DE | 102020109121 A1 | * | 10/2020 | ............ G01V 3/087 |
| DE | 102020135059 A1 | * | 7/2021 | ............ G06F 3/011 |
| EP | 1817606 B1 | * | 5/2013 | ........... G01S 5/0252 |
| JP | 2021514509 A | * | 6/2021 | ............ G01B 7/004 |
| KR | 20200110784 A | | 9/2020 | ............ G01R 33/07 |
| WO | WO-2006054295 A1 | * | 5/2006 | ........... G06F 3/0346 |
| WO | WO 2016/174659 | | 11/2016 | |
| WO | WO-2016174659 A1 | * | 11/2016 | ............ G06F 3/012 |
| WO | WO-2017189450 A1 | * | 11/2017 | ......... G02B 27/0093 |
| WO | WO-2019129355 A1 | * | 7/2019 | ............ G06T 7/0002 |
| WO | WO-2019165139 A1 | * | 8/2019 | ............ G06F 3/017 |
| WO | WO-2020023524 A1 | * | 1/2020 | ............ G06F 3/013 |

* cited by examiner

CORRECTING DISTORTIONS

CLAIM OF PRIORITY

This application claims priority under 35 USC § 119(e) to U.S. Patent Application Ser. No. 62/828,297, filed on Apr. 2, 2019, the entire contents of which are hereby incorporated by reference.

TECHNICAL FIELD

This disclosure relates to correcting distortions, for example, correcting distortions in an Electromagnetic Tracking (EMT) system.

BACKGROUND

Augmented Reality (AR) and Virtual Reality (VR) systems can use Electromagnetic Tracking (EMT) systems to aid location of devices in various contexts (e.g., gaming, medical, etc.). Such systems utilize a magnetic transmitter in proximity to a magnetic sensor such that the sensor and the transmitter can be spatially located relative to each other. Improper calibration of the transmitter with respect to the sensor (or vice versa) can cause the EMT system to report incorrect positions for the sensor or transmitter.

SUMMARY

Electromagnetic Tracking (EMT) systems, including those that are employed as part of an Augmented Reality (AR) and/or a Virtual Reality (VR) system, can employ one or more techniques for improving the determination of the position and orientation of a magnetic sensor relative to a magnetic transmitter. For example, one or more techniques may be employed to reduce/eliminate positional errors caused by distortions in the tracking environment (e.g., due to the presence of metallic and/or magnetic object at or near the tracking environment).

To ensure that the transmitter and sensor can provide accurate position and orientation measurements to the user, such distortions can be compensated for in the system. For example, one or more terms indicative of distortion in the tracking environment (e.g., a distortion term) can be determined, and future measurements provided by the sensor can be corrected using the one or more distortion terms.

In general, in an aspect, a system includes a magnetic transmitter configured to generate magnetic fields; a magnetic sensor configured to generate signals based on characteristics of the magnetic fields received at the magnetic sensor; and one or more computer systems configured to: cause the magnetic transmitter to generate a first plurality of magnetic fields at a first frequency; receive a first plurality of signals from the magnetic sensor; determine data indicative of a position and orientation of the magnetic sensor at a first position of the magnetic sensor; determine, based on the first plurality of signals and the data indicative of the position and orientation of the magnetic sensor at the first position, a distortion term that corresponds to a first position of the magnetic sensor; cause the magnetic transmitter to generate a third plurality of magnetic fields at the first frequency; receive a third plurality of signals from the magnetic sensor; and determine, based on the third plurality of signals received from the magnetic sensor and the distortion term, a second position and orientation of the magnetic sensor relative to the magnetic transmitter, wherein the first frequency is greater than the second frequency.

Implementations can include one or more of the following features in any combination.

In some implementations, determining data indicative of a position and orientation of the magnetic sensor at a first position of the magnetic sensor comprises: causing the magnetic transmitter to generate a second plurality of magnetic fields at a second frequency; and receiving a second plurality of signals from the magnetic sensor.

In some implementations, determining data indicative of a position and orientation of the magnetic sensor at a first position of the magnetic sensor comprises: obtaining optical data related to the position and orientation of the magnetic sensor at a first position using an optical system; and determining the data indicative of the position and orientation of the magnetic sensor at the first position based on the optical data.

In some implementations, the first and second plurality of magnetic fields are generated when the magnetic transmitter remains at a first position and a first orientation, and the first and second plurality of signals are generated by the magnetic sensor while the magnetic sensor remains at the first position and a first orientation.

In some implementations, the first plurality of signals is represented as a first 3×3 matrix of data, the second plurality of signals is represented as a second 3×3 matrix of data, and the distortion term is represented as a 3×3 matrix of data.

In some implementations, the 3×3 matrix of data corresponding to the distortion term is calculated at least in part by subtracting the second 3×3 matrix of data from the first 3×3 matrix of data.

In some implementations, the magnetic transmitter and the magnetic sensor are each associated with an inertial measurement unit (IMU) configured to provide inertial data.

In some implementations, the 3×3 matrix of data corresponding to the distortion term is calculated at least in part by multiplying the difference between the first 3×3 matrix of data and the second 3×3 matrix of data by inertial data of the magnetic transmitter and inertial data of the magnetic sensor obtained while the magnetic transmitter remains at a first position and a first orientation and the magnetic sensor remains at the first position and a first orientation.

In some implementations, multiplying the difference between the first 3×3 matrix of data and the second 3×3 matrix of data by the inertial data while the magnetic transmitter and the magnetic sensor remain at their respective first positions and orientations results in the 3×3 matrix of data corresponding to the distortion term to be rotated into an initial reference frame that corresponds to the first orientation of the magnetic transmitter and the first orientation of the magnetic sensor.

In some implementations, the 3×3 matrix of data corresponding to the distortion term at the initial reference frame is multiplied by inertial data of the magnetic transmitter and inertial data of the magnetic sensor obtained when the magnetic transmitter is at a second position and a second orientation and the magnetic sensor is at the second position and the second orientation to obtain a distortion term at a second reference frame, wherein the distortion term at the second reference frame is represented as a 3×3 matrix of data.

In some implementations, multiplying the 3×3 matrix of data corresponding to the distortion term at the initial reference frame by the inertial data obtained when the magnetic transmitter and the magnetic sensor are at their respective second positions and orientations results in the 3×3 matrix of data corresponding to the distortion term at the initial reference frame to be rotated into the second reference frame, wherein the 3×3 matrix of data corresponding to the distortion term at the second reference frame corresponds to the second orientation of the magnetic transmitter and the second orientation of the magnetic sensor.

In some implementations, the third plurality of signals is represented as a third 3×3 matrix of data, and the third 3×3 matrix of data corresponds to the second reference frame.

In some implementations, the third plurality of signals include distortions due to presence of one or more conductive or magnetic objects at or near a tracking environment of the system, and a third position and orientation of the magnetic sensor relative to the magnetic transmitter that corresponds to the third plurality of signals includes inaccuracies in one or more dimensions.

In some implementations, the one or more computer systems are further configured to: determine, based on the third 3×3 matrix of data corresponding to the second reference frame and the 3×3 matrix of data corresponding to the distortion term at the second reference frame, an undistorted term that corresponds to the second position and orientation of the magnetic sensor; and determine, based on the undistorted term, the second position and orientation of the magnetic sensor relative to the magnetic transmitter.

In some implementations, the undistorted term is determined by subtracting the 3×3 matrix of data corresponding to the distortion term at the second reference frame from the third 3×3 matrix of data corresponding to the second reference frame.

In some implementations, the undistorted term corresponds to a correct position and orientation of the magnetic sensor, and the second position and orientation of the magnetic sensor represent the correct position and orientation of the magnetic sensor.

In some implementations, the second position and orientation of the magnetic sensor does not include inaccuracies that would otherwise be caused by distortions in the third plurality of signals due to presence of one or more conductive or magnetic objects at or near a tracking environment of the system if the undistorted term were not considered.

In some implementations, the first frequency is 30 KHz or greater.

In some implementations, the second frequency is 1.1 KHz or less.

In some implementations, the second frequency is 100 Hz.

In general, in another aspect, a method includes: causing a magnetic transmitter to generate a first plurality of magnetic fields at a first frequency; receiving, from a magnetic sensor, a first plurality of signals; determining data indicative of a position and orientation of the magnetic sensor at a first position of the magnetic sensor; determining, based on the first plurality of signals and the data indicative of the position and orientation of the magnetic sensor at the first position, a distortion term that corresponds to a first position of the magnetic sensor; causing the magnetic transmitter to generate a third plurality of magnetic fields at the first frequency; receiving, from the magnetic sensor, a third plurality of signals; and determining, based on the third plurality of signals received from the magnetic sensor and the distortion term, a second position and orientation of the magnetic sensor relative to the magnetic transmitter, wherein the first frequency is greater than the second frequency.

In general, in another aspect, one or more non-transitory computer-readable media store instructions operable to cause a computing device to perform operations comprising: causing a magnetic transmitter to generate a first plurality of magnetic fields at a first frequency; receiving, from a magnetic sensor, a first plurality of signals; determining data indicative of a position and orientation of the magnetic sensor at a first position of the magnetic sensor; determining, based on the first plurality of signals and the data indicative of the position and orientation of the magnetic sensor at the first position, a distortion term that corresponds to a first position of the magnetic sensor; causing the magnetic transmitter to generate a third plurality of magnetic fields at the first frequency; receiving, from the magnetic sensor, a third plurality of signals; and determining, based on the third plurality of signals received from the magnetic sensor and the distortion term, a second position and orientation of the magnetic sensor relative to the magnetic transmitter, wherein the first frequency is greater than the second frequency.

Advantages of the systems and techniques described herein include employing multiple modes of operation for the system. For example, in a first operating mode (e.g., a normal or typical mode of operation), the system may be configured to operate at a relatively high frequency (e.g., 30 KHz). Such a frequency may include one or more advantages, such as improved speed, better suitability for customer/applications, etc.). However, the first operating mode may be susceptible to errors. As such, the system may also be configured to operate in a second operating mode (e.g., a specialized operating mode). The second operating mode may be occasionally applied when circumstances warrant (e.g., when the magnetic sensor and magnetic transmitter temporarily cease movement). In the second operating mode, the system may be configured to operate at a comparatively lower frequency (e.g., 100 Hz), which may not be susceptible to the aforementioned errors, but may include one or more disadvantages that are not suited for a normal/typical operating mode (e.g., too slow). Information obtained during operation in the second mode at the second frequency, during which effects of potential distortions in the tracking environment are reduced or minimized, can be used to correct measurements obtained when the system is operating in the first mode at the first frequency. For example, one or more distortion terms can be determined and used to compensate for distortions in the tracking environment, thereby resulting in an accurate position and orientation of the magnetic sensor relative to the magnetic transmitter to be provided while the system is operating in the first operating mode.

In some implementations, rather than operating in a second operating mode, the system may be configured to employ one or more other techniques for obtaining measurements that are not impacted by environmental distortions, For example, an optical system (among others) can be used to determine a clean pose of the sensor and/or the transmitter based on optical data. In this way, the pose of the sensor as determined based on the optical data may be taken as truth data indicative of the actual pose of the sensor.

In some implementations, the tracking environment can be mapped prior to the pose of the sensor being determined. For example, distortion terms corresponding to various locations within the tracking environment can be determined ahead of time. When a true pose of the sensor is to be determined, a previously obtained distortion term that corresponds to the location of the sensor can be used to compute a clean pose of the sensor. In this way, distortion terms need not be determined in real time.

In some implementations, once a distortion term is identified, either the transmitter or the sensor (e.g., the receiver) can be "rotated" to a different pose. In other words, characteristics of the fields generated by the transmitter or data provided by the sensor can be modified such that it corresponds to a pose other than the current pose of the transmitter and/or the sensor. In this way, the transmitter and/or the sensor is rotated in a simulated manner.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
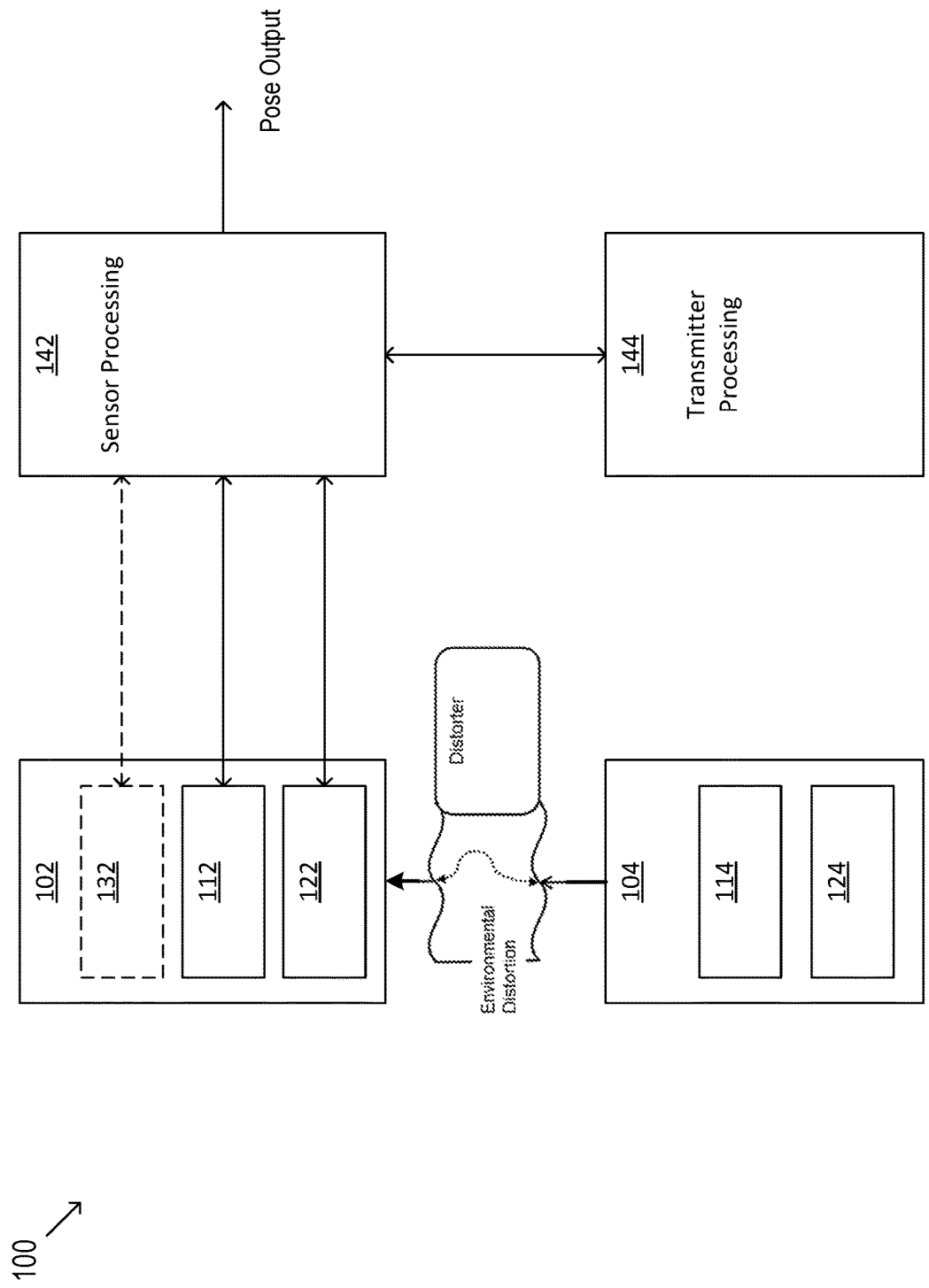
FIG. 1 shows an example Electromagnetic Tracking (EMT) system.

An Electromagnetic Tracking (EMT) system can be used in gaming and/or surgical settings to track devices (e.g., gaming controllers, head-mounted displays, medical equipment, robotic arms, etc.), thereby allowing their respective three-dimensional positions and orientations to be known to a user of the system. AR and VR systems also use EMT systems to perform head, hand, and body tracking, for example, to synchronize the user's movement with the AR/VR content. Such systems use a magnetic transmitter in proximity to a magnetic sensor to determine the position and orientation (P&O) of the sensor relative to the transmitter.

Such systems can employ one or more techniques for improving the determination of the P&O of the sensor relative to the transmitter. For example, one or more techniques may be employed to reduce/eliminate positional errors caused by distortions in the tracking environment. For example, the EMT system may be sensitive to metallic objects, which can manifest as distortion in the tracking environment (e.g., distortions of the magnetic fields generated by the transmitter and/or sensed by the sensor). Distortion can include conductive distortion and ferromagnetic distortion. Conductive distortion is generally caused by eddy currents set up within conductive objects by alternating magnetic fields (e.g., such as those produced by the transmitter). The eddy currents generate additional magnetic fields, which can be indistinguishable from those produced by the transmitter. These additional fields can cause the EMT system 100 to report erroneous P&O results. Ferromagnetic distortion can be caused by magnetic reluctance of materials at or near the tracking environment 106. Such magnetic reluctance "bends" the magnetic fields from their normal geometry. Such distortions cause the magnetic fields to depart from a magnetic field model on which a P&O algorithm is based, thereby causing erroneous P&O results to be reported.

To ensure that the transmitter and sensor can provide accurate P&O measurements to the user, such distortions can be compensated for in the system; for example, distortions can be compensated for by determining one or more terms indicative of distortion in the tracking environment (e.g., a distortion term) and using the one or more distortion terms to correct future measurements provided by the sensor.

In some implementations, a distortion term can be determined for an initial sampled location (e.g., an initial P&O of the sensor) and used to correct a P&O measurement at a subsequent sampled location (e.g., a subsequent P&O of the sensor) close to the initial sampled location. The distance between the initial location and the subsequent location may depend on the distortion gradients at the sampled locations. An undistorted (e.g., "clean") pose output of the sensor at the initial sampled location may be acquired using one or more low distortion trackers (e.g., trackers that are minimally impacted by distortions or trackers that are not susceptible to distortions). In some implementations, the low distortion tracker may be configured to operate the system at a relatively low frequency, thereby minimizing or eliminating the effects of distortions in the tracking volume. In this way, a "trusted vector" (e.g., a true P&O) of the sensor is determined.

Alternatively or additionally, the undistorted pose output of the sensor at the initial sampled location may be acquired using one or more other techniques (e.g., one or more other "low distortion trackers") that are minimally or not susceptible to distortion. For example, in some implementations, an optical system including one or more cameras mounted at the sensor, the transmitter, and/or one or more location(s) at or near the tracking volume can be used to determine the trusted vector indicative of the true P&O of the sensor based on visual data. In some implementations, other types of low distortion trackers can be used to compensate output of the sensor, for example, infrared tracking, acoustic tracking, or another P&O tracking method that is not susceptible or less susceptible to distortion effects of metal in the environment (e.g., as compared to the normal operating mode that employs high frequency EM tracking, as described herein), to name a few.

In some implementations, distortion terms can be determined for a plurality of locations within a tracking volume during a "mapping" or "initialization" routine. For example, distortion terms indicative of environmental distortion throughout the tracking volume can be obtained by moving the sensor throughout the tracking volume and recording the P&O output of the sensor (e.g., distorted P&O measurements). A corresponding clean P&O measurement indicative of the true P&O of the sensor can be determined for the various distorted P&O measurements, and a corresponding distortion term can be determined for a particular location within the tracking volume. The clean P&O measurements (e.g., corresponding to the trusted vectors) can be determined using a low distortion tracker (e.g., the optical system, the low frequency mode, etc.), as described briefly above and in more detail below. In this way, distortion terms can be correlated to various clean poses within the tracking volume, and in some implementations, additional distortion terms can be determined for other locations within the tracking volume (e.g., locations that were not specifically sampled) using one or more extrapolation techniques. The distortion terms mapped throughout the tracking volume can be used to determine an undistorted P&O of the sensor when the sensor is positioned, for example, at or near a location that corresponds to a distortion term, as described in more detail below.

FIG. 1 shows an example of an EMT system 100 that can be used as part of an AR/VR system. The EMT system 100 includes at least a magnetic sensor 112, an orientation measurement device (OMD) 122, a magnetic transmitter 114, and another OMD 124. The OMDs 122, 124 are relatively insensitive (or, e.g., not sensitive) to metal in the environment. Therefore, the OMDs 122, 124 can be used to determine the clean orientation of the sensor 112 and/or the transmitter 114. In some implementations, the OMDs 122, 124 may include one or more inertial measurement units (IMUs) and/or an optical system that can measure an orientation of the sensor 112 relative to the transmitter 114, or vice versa. In some implementations, the sensor 112 and OMD 122 are incorporated at a head-mounted display (HMD) 102 and the magnetic transmitter 114 and OMD 124 are incorporated at a controller 104. The EMT system 100 also includes sensor processing 142 and transmitter processing 144. The sensor processing 142 and transmitter processing 144 may be located at the HMD 102 and/or the controller 104, either separately or together, or may alternatively be located at a separate electronic device (e.g., a computer system). The EMT system 100 may also include a low distortion tracker 132. The low distortion tracker 132 is relatively insensitive (or, e.g., not sensitive) to metal in the environment. Therefore, like the OMDs 122, 124 described above, the low distortion tracker 132 can be used to determine the clean P&O of the sensor 112 and/or the transmitter 114. In some implementations, the low distortion tracker 132 may include an optical system with one or more cameras located at the HMD 102 and/or the controller 104. Such an optical system can be used instead of or in addition to a low-frequency operating mode that is not susceptible to environmental distortions.

In general, the EMT system 100 is configured to compensate for distortions at or around a tracking environment. For example, a "distorted" P&O output of the sensor 112 at an initial pose may include errors due to environmental distortion. A "clean" P&O of the sensor 112 can be determined at the initial pose using a technique that is not susceptible to environmental distortions. For example, an optical system or a low-frequency operating mode can be used to determine the clean/true P&O of the sensor 112 (e.g., sometimes referred to as a trusted vector), an example of which is described in more detail below. Using both the distorted P&O and the clean P&O of the sensor 112 at the initial pose, a distortion term that corresponds to the initial pose can be determined. When the sensor 112 is subsequently positioned at a new pose, the distortion term that corresponds to the initial pose can then be used to correct a distorted P&O output of the sensor 112 at the new pose.

While two particular low distortion trackers are described herein, it should be understood that other low distortion trackers can be used. One of the functions of the low distortion tracker is to develop the trusted vector that corresponds to the clean/true P&O of the sensor 112 based on one or more measurements. The trusted vector represents a true position and orientation of the sensor 112. Thus, any technique for determining the true position and orientation of the sensor 112 may be included in the EMT system 100 for the purposes described herein.

In some implementations, rather than or in addition to determining distortion terms substantially in real time as described above, the tracking environment may be mapped ahead of time. In this way, distortion terms indicative of environmental distortions that correspond to various poses within the tracking environment can be determined as part of an initialization routine, and such distortion terms can subsequently be applied to distorted P&O outputs of the sensor 112 to provide a clean P&O of the sensor 112. Such an implementation is described in more detail below.

Figure 2:
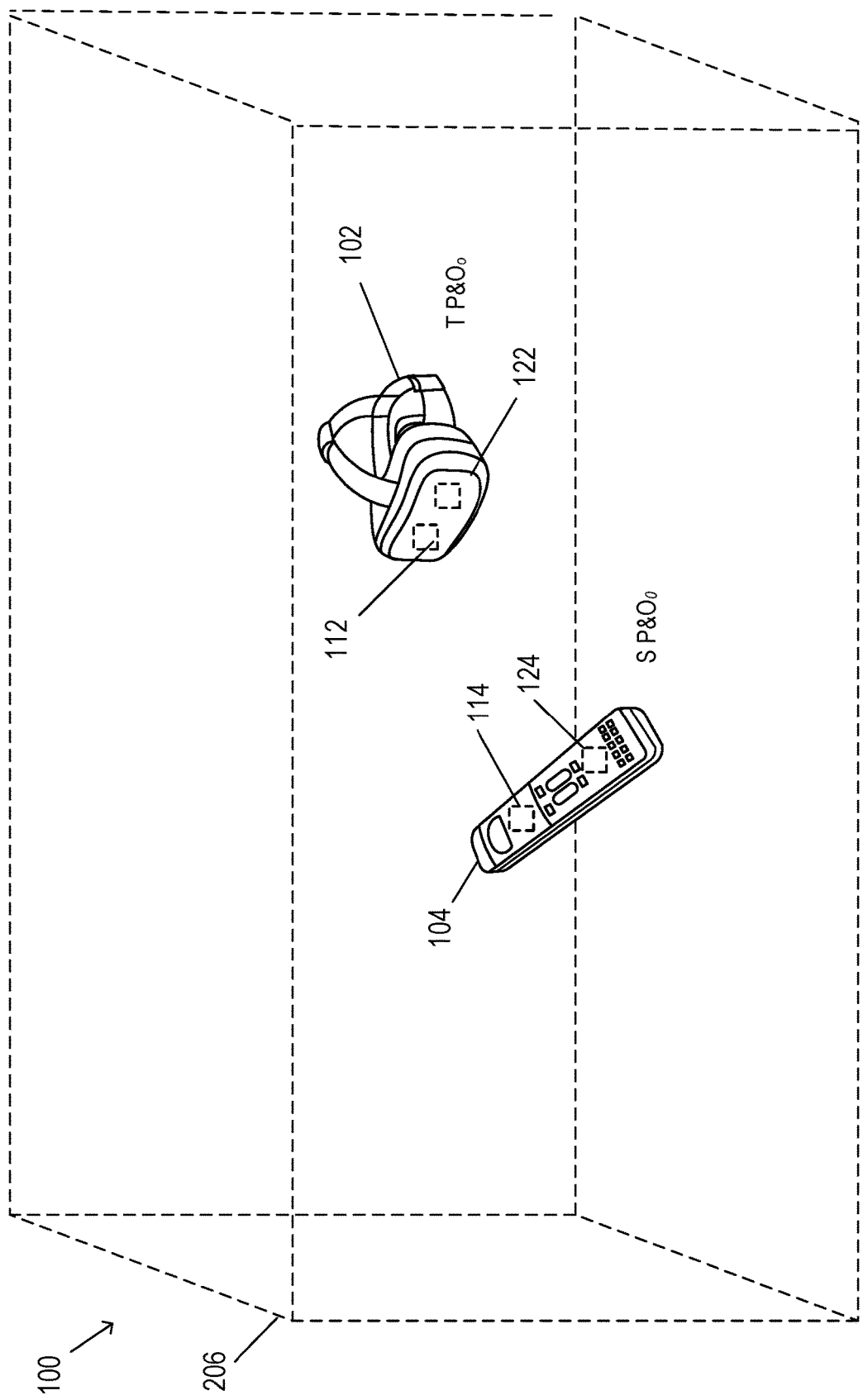
FIG. 2 shows another example of the EMT system of FIG. 1 with the sensor and transmitter in an initial position and orientation.

FIG. 2 shows an example of the EMT system 100 of FIG. 1. The EMT system 100 includes at least a head-mounted display (HMD) 102 that includes the magnetic sensor 112 and the OMD 122, and a controller 104 that includes the magnetic transmitter 114 and the OMD 124.

In some examples, a VR system uses computer technology to simulate the user's physical presence in a virtual or imaginary environment. VR systems may create three-dimensional images and/or sounds through the HMD 102 and tactile sensations through haptic devices in the controller 104 or wearable devices to provide an interactive and immersive computer-generated sensory experience. In contrast, AR systems may overlay computer-generated sensory input atop the user's live experience to enhance the user's perception of reality. For example, AR systems may provide sound, graphics, and/or relevant information (e.g., such as GPS data to the user during a navigation procedure). Mixed Reality (MR) systems—sometimes referred to as hybrid reality systems—may merge real and virtual worlds to produce new environments and visualizations where physical and digital objects co-exist and interact in real-time.

The HMD 102 and the controller 104 are configured to track position (e.g., in x, y, and z) and orientation (e.g., in azimuth, altitude, and roll) in three-dimensional space relative to each other. For example, the transmitter 114 is configured to track the sensor 112 (e.g., relative to a reference frame defined by the position and orientation of the transmitter 114), and/or the sensor 112 is configured to track the transmitter 114 (e.g., relative to a reference frame defined by the position and orientation of the sensor 112). In some implementations, the system 100 is configured to track the position and orientation (e.g., the P&O) of the sensor 112 and/or the transmitter 114 in a tracking environment 106 of the EMT system. In this way, the P&O of the HMD 102 and/or the controller 104 can be tracked relative to each other and relative to a coordinate system defined by the EMT system 100. For example, the HMD 102 and the controller 104 can be used to perform head, hand, and/or body tracking, for example, to synchronize the user's movement with the AR/VR content. While the tracking environment 106 is illustrated as being a defined space, it should be understood that the tracking environment 106 may be any three-dimensional space, including three-dimensional spaces without boundaries (e.g., large indoor and/or outdoor areas, etc.). The particular sensor 112 and transmitter 114 employed by the EMT system 100 may be determined by the procedure type, measurement performance requirements, etc.

In some implementations, the transmitter 114 includes three orthogonally wound magnetic coils, referred to herein as the X, Y, and Z coils. Electrical currents traveling through the three coils cause the coils to produce three orthogonal sinusoidal magnetic fields at a particular frequency (e.g., the same or different frequencies). In some implementations, time division multiplexing (TDM) may also be used. For example, in some implementations, the coils may produce magnetic fields at the same frequency (e.g., 30 KHz) but at non-overlapping times. The sensor 112 also includes three orthogonally wound magnetic coils, referred to herein as the x, y, and z coils. Voltages are induced in the coils of the sensor 112 in response to the sensed magnetic fields by means of magnetic induction. Each coil of the sensor 112 generates an electrical signal for each of the magnetic fields generated by the coils of the transmitter 114; for example, the x coil of the sensor 112 generates a first electrical signal in response to the magnetic field received from the X coil of the transmitter 114, a second electrical signal in response to the magnetic field received from the Y coil of the transmitter 114, and a third electrical signal in response to the magnetic field received from the Z coil of the transmitter 114. They and z coils of the sensor 112 similarly generate electrical signals for each of the magnetic fields generated by the X, Y, and Z coils of the transmitter 114 and received at/by they and z coils of the sensor 112.

As described in more detail below, in some implementations, the transmitter 114 may be configured to use a particular frequency depending on a mode in which the transmitter 114 is currently operating. For example, in a first mode (e.g., during normal operation of the transmitter 114 as implemented in the EMT system 100 or in an AR or VR system), the transmitter 114 may be configured to generate magnetic fields at a frequency of 30 KHz or greater (e.g., 30 KHz, 34 KHz, etc.) In some implementations, in a second mode (e.g., for minimizing the effects of potential distorters in the environment), the transmitter 114 may be configured to generate magnetic fields at a frequency of 1.1 KHz or less (e.g., 1.1 KHz, 1 KHz, 100 Hz, etc.).

The data from the sensor 112 can be represented as a matrix of data (e.g., a 3×3 matrix), sometimes referred to as a measurement matrix, which can be resolved into the P&O (e.g., sometimes referred to as the pose) of the sensor 112 with respect to the transmitter 114, or vice versa. In this way, the P&O of the sensor 112 and the transmitter 114 is measured. An example of a 3×3 signal measurement matrix (e.g., sometimes referred to as an S-matrix) is shown below, where each matrix element represents the sensor signal in the indicated coil of the sensor 112 (x, y, z) due to energizing a single coil of the transmitter 114 (X, Y, Z), and where the columns represent the signal produced by the coils of the transmitter 114 (X, Y, Z) and the rows represent signals measured by the coils of the sensor 112 (x, y, z):

$$\text{Measurement Matrix} = \begin{bmatrix} X_x & Y_x & Z_x \\ X_y & Y_y & Z_y \\ X_z & Y_z & Z_z \end{bmatrix}$$

It should be understood that the particular mathematic processes described herein are a result of merely one example technique for determining a pose of a sensor relative to a transmitter. The particular mathematical transforms performed may differ, as those skilled in the art would understand. The exemplary mathematics should not be interpreted as limiting the general inventive concept of using a low distortion tracker to correct a pose of the sensor and/or transmitter at a subsequent sampled location, as described herein.

The sensor processing (142 of FIG. 1) and the transmitter processing (144 of FIG. 1), which may be incorporated in the HMD 102 and/or the controller 104 or located separately from the HMD 102 and controller 104, are configured to determine the P&O of the HMD 102 relative to the controller 104 and vice versa based on characteristics of the magnetic fields generated by the transmitter 114 and the various electrical signals generated by the sensor 112.

In some implementations, the sensor processing 142 and the transmitter processing 144 may be implemented as one or more computer systems. For example, one or more computer systems may be configured to resolve the data from the sensor 112 into the P&O of the sensor 112. In some implementations, the one or more computer system can include EM sensor processing functionality and/or EM transmitter processing functionality. In some implementations, one or more computer systems incorporated into the HMD 102 and/or the controller 104 (or, e.g., the sensor 112 and/or the transmitter 114) may be configured to determine the P&O of the sensor 112. In some implementations, EM sensor processing functionality and EM transmitter processing functionality may be incorporated into a single computer system (e.g., at the HMD 102/sensor 112, at the controller 104/transmitter 114, or at a separate computer system). The sensor 112, the transmitter 114, and/or the separate computer system may be configured to communicate information to each other (e.g., via a wireless connection, a wired connection, etc.). As described below, a separate computer system may also be configured to determine the P&O of the sensor 112 and transmitter 114, and such information may be provided to the HMD 102 and/or the controller 104.

The AR/VR system and/or the EMT system 100 can employ one or more techniques for improving the determination of the P&O of the sensor 112 relative to the transmitter 114. For example, one or more techniques may be employed to reduce/eliminate positional errors caused by distortions in the tracking environment 106. The EMT system 100 may be sensitive to metallic objects, which can manifest as distortion in the tracking environment 106 (e.g., distortions of the magnetic fields generated by the transmitter 114 and/or sensed by the sensor 112). Distortion can include conductive distortion and ferromagnetic distortion. Conductive distortion is generally caused by eddy currents set up within conductive objects by alternating magnetic fields (e.g., such as those produced by the transmitter 114). As mentioned above, the eddy currents can generate additional magnetic fields, which can be indistinguishable from those produced by the transmitter 114. These additional fields can cause the EMT system 100 to report erroneous P&O results. For example, an algorithm for determining the P&O of the sensor 112 based on sensor signals may employ a field model of the magnetic fields generated by the transmitter 114 with no additional fields due to eddy current, and as such, the reported results do not provide an accurate representation of the P&O of the transmitter 114 and/or the sensor 112 when distortions are present.

Ferromagnetic distortion can be caused by magnetic reluctance of materials at or near the tracking environment 106. Such magnetic reluctance "bends" the magnetic fields from their normal geometry, again causing the magnetic fields to depart from the magnetic field model on which the P&O algorithm is based, thereby causing erroneous results to be reported.

To ensure that the transmitter 114 and sensor 112 can provide accurate P&O measurements to the user, such distortions can be compensated for in the EMT system 100, for example, by determining one or more terms indicative of distortion in the tracking environment 106 (e.g., a distortion term), and using the one or more distortion terms to correct future measurements provided by the sensor 112. A particular distortion term may correspond to a particular position within the tracking environment 106. In some implementations, a particular distortion term may correspond to a particular P&O of the sensor 112 relative to a particular P&O of the transmitter 114. In some implementations, a particular distortion term may correspond to a particular position of the sensor 112 relative to a particular position of the transmitter 114, and the particular distortion term can be mathematically adjusted to correspond to various orientations of the sensor 112 and/or the transmitter 114 at the particular position, as described in more detail below.

In some implementations, the EMT system 100 may determine an initial distortion term while the sensor 112 and the transmitter 114 are in an initial P&O (e.g., an initial reference frame). Thereafter, the sensor 112 and/or the transmitter 114 may move to a second P&O (e.g., a second reference frame). The distortion term obtained at the initial reference frame can be used to mathematically adjust the sensor measurements provided by the sensor 112 when the sensor 112 is at the second P&O to provide an accurate (e.g., correct, or "true") position of the sensor 112 relative to the transmitter 114. In other words, the sensor measurements provided by the sensor 112 when the sensor 112 is at the second P&O may otherwise include inaccuracies due to distortions in the tracking environment 106. The distortion term can be representative of such distortions. Thus, the distortion term may be used to remove the effects of such distortions from the sensor signal when the sensor 112 is at the second P&O.

While the EMT system 100 is configured to determine the orientation of the sensor 112 and the transmitter 114 relative to each other by employing electromagnetic tracking techniques, the sensor 112 and the transmitter 114 are each associated with an orientation measurement device (OMD) 122, 124 configured to provide information related to the orientation of the sensor 112 and the transmitter 114. In some implementations, the OMD 122, 124 are inertial measurement units (IMUs) that are configured to provide inertial data that corresponds to the sensor 112 and transmitter 114. In some implementations in which IMUs are employed, each of the OMDs 122, 124 may be configured to collect inertial data that corresponds to (e.g., is associated with) the sensor 112 and the transmitter 114. In some implementations, the IMUs include one or more accelerometers and/or one or more gyroscopes configured to collect the inertial data. The inertial data can be used to determine, among other things, the orientation of the sensor 112 and the transmitter 114. For example, the IMUs may be configured to measure specific force and/or angular rate, which can be used to determine an orientation, heading, velocity, and/or acceleration of the IMU (and, e.g., the HMD 102 and controller 104). In some implementations, the determined velocity and/or acceleration can be used to assist in determining the position of the sensor 112 and the transmitter 114. For example, the determined velocity and/or acceleration can be used to determine a change in position of the sensor 112 and/or the transmitter 114 over time. The inertial data can be communicated between the one or more computer systems described above. For example, in some implementations, the inertial data related to the sensor 112 may be wirelessly provided to the transmitter 114 and vice versa. In some implementations, a separate computer system may facilitate the exchange of inertial and other data between the sensor 112 and the transmitter 114.

In some implementations, rather than IMUs being employed, the OMDs 122, 124 may include an optical system that is used to determine the orientation of the sensor 112 relative to the transmitter 114 and vice versa. In this way, the true orientation of the sensor 112 and/or the transmitter 114 can be determined based on optical data rather than inertial data.

In some implementations, the sensor 112 may produce degraded (e.g., inaccurate) data due to operation in an EM distorted environment, thereby resulting in inaccurate pose output. Described herein are EM distortion compensation systems and techniques for determining a "clean" (e.g., undistorted) S-matrix representative of the pose of the sensor 112. The clean/undistorted S-matrix representative of an accurate P&O of the sensor 112 at an arbitrary reference frame (i) (e.g., an arbitrary P&O) may be denoted as $S_{clean_i}$, which can be computed according to Equation (1):

$$S_{clean_i} = S_{rec_i} - S_{dist_i} \quad (1)$$

where $S_{rec_i}$ is a degraded S-matrix (e.g., due to inaccuracies caused by distorters at or near the tracking environment 106) when the sensor 112 is at the arbitrary reference frame i and $S_{dist_i}$ is a distortion term corresponding to the arbitrary reference frame i. As $S_{rec_i}$ is measured, the systems and techniques described herein are directed to finding the distortion matrix $S_{dist_i}$ at the arbitrary reference frame.

The magnitude of a signal matrix from the sensor 112 remains constant over arbitrary rotations of rows and columns (e.g., via the Frobenius norm). In the systems and techniques described herein, the rows and columns of the S-matrices correspond to physical orientations of the sensor 112 and transmitter 114. In some implementations, an S-matrix obtained when the sensor 112 and transmitter 114 are at an initial reference frame (e.g., initial reference frame 0) may be used to compute a distortion term at the initial reference frame 0, the distortion term at the initial reference frame 0 can be used to determine a distortion term at another reference frame (e.g., an arbitrary reference frame i), and the distortion term at the arbitrary reference frame i can be used to determine the P&O of the sensor 112 at the arbitrary reference frame i (e.g., at a later time relative to a time at which the distortion term at the initial reference frame 0 is obtained).

In the example illustrated in FIG. 2, the HMD 102/sensor 112 and the controller 104/transmitter 114 are at an initial reference frame 0. In particular, the HMD 102/sensor 112 are at an initial reference frame (S P&$O_0$) and the controller 104/transmitter 114 are at an initial reference frame (T P&$O_0$). In the initial reference frames S P&$O_0$ and T P&$O_0$, the sensor 112 and the transmitter 114 are each at a first (e.g., initial) position and orientation. In some implementations, the initial reference frame corresponds to a time at which the sensor 112 and the transmitter 114 have ceased or substantially ceased movement for a period of time (e.g., as determined by the OMDs 122, 124).

With the sensor 112 and the transmitter 114 at the initial reference frame, a first measurement is obtained by the sensor 112. In particular, the coils of the transmitter 114 are configured to generate a first plurality of magnetic fields at a first frequency. The first frequency may be a frequency at which the EMT system 100, AR, and/or VR systems are configured to operate under normal operating conditions (e.g., during typical use of the EMT system 100). In some implementations, the first frequency may be used when the EMT system 100 is operating in a first/normal mode of operation. The first frequency may be a frequency of 30 KHz or greater (e.g., 30 KHz, 34 KHz, etc.). In some implementations, the first frequency is one that may be susceptible to inaccuracies due to potential distorters in the tracking environment 106.

A first plurality of signals is received from the sensor 112. For example, the sensor 112 is configured to generate signals based on characteristics of the magnetic fields received at the sensor 112. The magnetic fields received at the sensor 112 may be largely based on the magnetic fields generated by the transmitter 114 at the first frequency. However, one or more potential distorters in the tracking environment 106, among other things, may cause the generated magnetic fields to "bend" from their normal geometry. Such distortions may cause the first plurality of signals received from the sensor 112 to provide an incorrect P&O of the sensor 112 relative to the transmitter 114. The first plurality of signals can be represented as a first 3×3 S-matrix of data, referred to herein as $S_{rec0}$. For example, $S_{rec0}$ is received while the sensor 112 and transmitter 114 are at the initial reference frame S P&$O_0$ and T P&$O_0$ and the transmitter 114 generates magnetic fields at the first frequency.

With the sensor 112 and the transmitter 114 still at or close to the initial reference frame 0, a true pose of the sensor 112 is determined (e.g., an actual pose of the sensor 112 without inaccuracies due to distortions). For example, in some implementations, a second measurement is obtained by the sensor 112. In particular, the coils of the transmitter 114 are configured to generate a second plurality of magnetic fields at a second frequency. The second frequency may be a frequency at which the EMT system 100, AR, and/or VR systems are configured to operate under a specialized operating condition (e.g., while the sensor 112 and the transmitter 114 are stationary or almost stationary, for example, while a user of the EMT system 100 temporarily stops moving). In some implementations, the second frequency may be used when the EMT system 100 is operating in a second/undistorted mode of operation. The second frequency may be a frequency of 1.1 KHz or less (e.g., 1.1 KHz, 1 KHz, 100 Hz, etc.). In some implementations, the second frequency is one that is unsusceptible (or, e.g., significantly less susceptible than the first frequency) to inaccuracies due to potential distorters in the tracking environment 106.

A second plurality of signals is received from the sensor 112. For example, the sensor 112 is configured to generate signals based on characteristics of the magnetic fields received at the sensor 112. The magnetic fields received at the sensor 112 may be largely based on the magnetic fields generated by the transmitter 114 at the second frequency. Any potential distorters in the tracking environment 106 may have a limited impact on the magnetic fields generated using the second frequency. As such, potential distorters may not cause (or, e.g., may cause to a significantly lesser extent) the magnetic fields generated at the second frequency to "bend" from their normal geometry relative to the magnetic fields generated at the first frequency. Therefore, the second plurality of signals received from the sensor 112 provide an accurate P&O of the sensor 112 relative to the transmitter 114. The second plurality of signals can be represented as a second 3×3 S-matrix of data, referred to herein as $S_{clean0}$. For example, $S_{clean0}$ is received while the sensor 112 and transmitter 114 are at the initial reference frame S P&$O_0$ and T P&$O_0$ and the transmitter 114 generates magnetic fields at the second frequency. $S_{clean0}$ is referred to as a "clean" S-matrix because it is assumed to accurately correspond to "clean" (e.g., undistorted) magnetic fields received at the sensor 112. In other words, $S_{clean0}$ theoretically represents the signals that would be provided by the sensor 112 in an environment that does not include any distortions. As such, it is expected that $S_{clean0}$ can be resolved into an accurate (e.g., true, correct, actual, etc.) P&O of the sensor 112 when the sensor 112 is at the initial reference frame.

In some implementations, $S_{clean0}$ can be determined using the low distortion tracker 132. That is, rather than operating the sensor 112 and transmitter 114 in a low-frequency operating mode to determine the clean pose of the sensor 112, an optical system including one or more cameras can be used to determine a clean, undistorted pose of the sensor 112 at the initial reference frame. The low distortion tracker 132 along with the sensor processing 142 and transmitter processing 144 can be used to represent the clean pose of the sensor 112 at the initial reference frame as a 3×3 matrix of data, as $S_{clean0}$.

In some implementations, the OMDs 122, 124 corresponding to the sensor 112 and the transmitter 114, when implemented as IMUs, may provide inertial data while the sensor 112 and the transmitter 114 are at the initial reference frame 0. Such inertial data can be used to determine an orientation of the sensor 112 and the transmitter 114. In some implementations, the orientations as determined based on the inertial data may be taken as accurate orientation data (e.g., the true orientation of the sensor 112 and the transmitter 114). In some implementations, the IMUs may each be a 9-axis IMU, and the orientation data may be provided to the sensor processing 142 and/or the transmitter processing 144.

As described above, in some implementations, the OMDs 122, 124 may be implemented at least in part by an optical system that includes one or more cameras. The optical system can determine the true orientation of the sensor 112 and/or the transmitter 114 using optical data. In this way, using IMU(s) and/or an optical system, data indicative of the orientation of the sensor 112 and transmitter 114 can be determined.

A distortion term that corresponds to the initial reference frame 0, $S_{dist0}$, may be calculated according to Equation (2):

$$S_{dist_o} = R_{s_o}(S_{rec_o} - S_{clean_o})R_{t_o} \quad (2)$$

where $S_{rec0}$ is the S-matrix of the sensor 112 received while the sensor 112 and transmitter 114 are at the initial reference frame and while the transmitter 114 generates magnetic fields at the first frequency, $S_{clean0}$ is the S-matrix of the sensor 112 received while the sensor 112 and transmitter 114 are at the initial reference frame and while the transmitter 114 generates magnetic fields at the second frequency, $R_{s0}$ is data indicative of the orientation of the sensor 112 at the initial reference frame, and $R_{t0}$ is data indicative of the orientation of the transmitter 114 at the initial reference frame. In particular, the difference between $S_{rec0}$ and $S_{clean0}$ are rotated into the initial reference frame 0 by multiplying the difference by $R_{s0}$ and $R_{t0}$.

Figure 3:
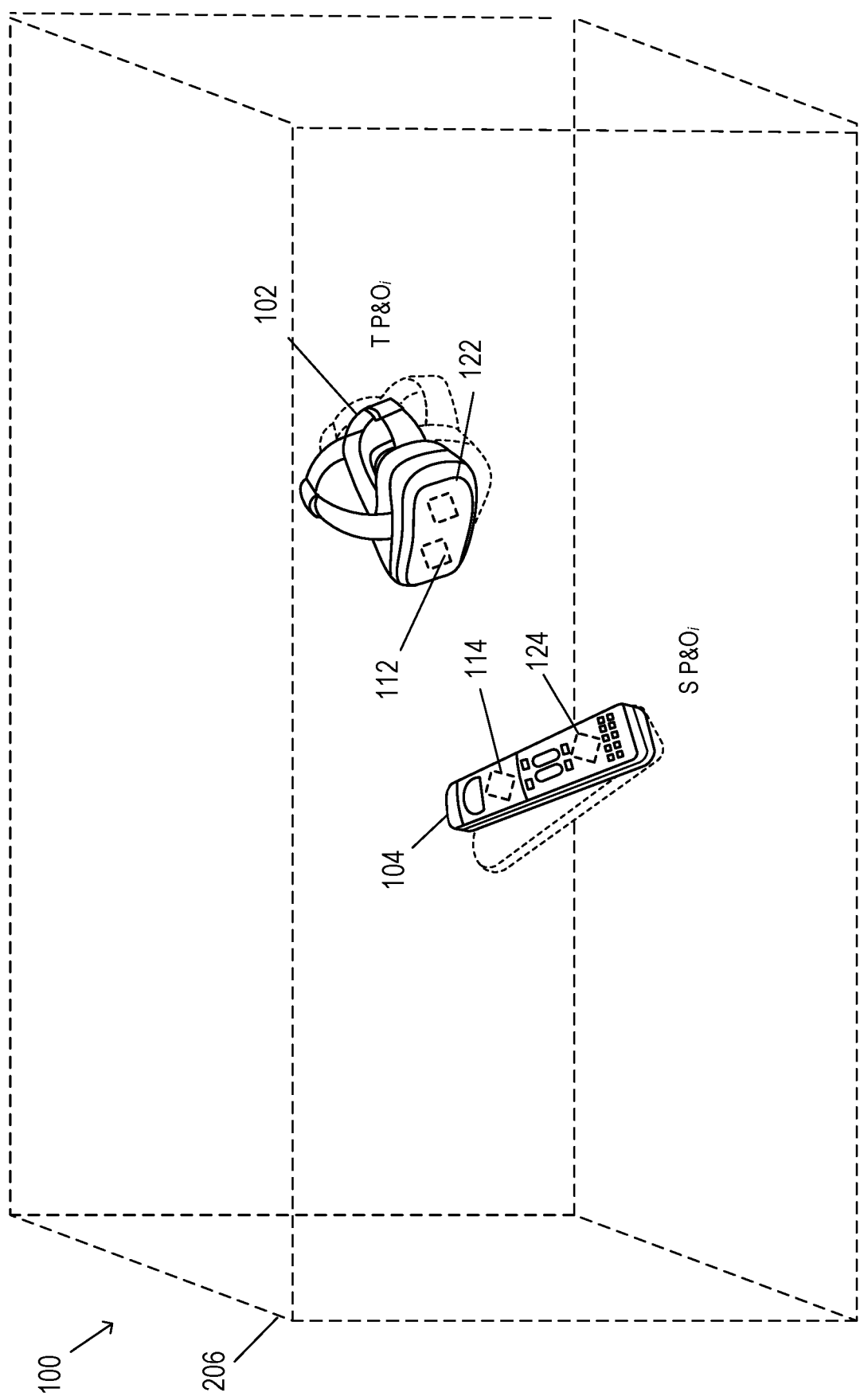
FIG. 3 shows another example of the EMT system of FIG. 2 with the sensor and transmitter in a second position and orientation.

The distortion term that corresponds to the initial reference frame 0, $S_{dist0}$, may be stored (e.g., by the one or more computer systems) and used to calculate a distortion term at an arbitrary reference frame i, (e.g., $S_{disti}$), for example, once the sensor 112 and/or the transmitter 114 resume movement. For example, after the sensor 112 and/or the transmitter 114 move to a second position and orientation that correspond to a second reference frame S P&$O_i$ and T P&$O_i$, as illustrated in FIG. 3, the initial distortion term $S_{dist0}$ can be rotated into the second reference frame i according to Equation (3):

$$S_{dist_i} = R_{s_i} S_{dist_o} R_{s_i} \quad (3)$$

where $R_{si}$ is data indicative of the orientation of the sensor 112 at the second reference frame i, and $R_{ti}$ is data indicative of the orientation of the transmitter 114 at the second reference frame i. In other words, the distortion term that corresponds to the initial reference frame 0, $S_{dist0}$, is multiplied by data indicative of the position and orientation of the sensor 112 and transmitter 114 at the second reference frame in order to rotate the initial distortion term, $S_{dist0}$, into the second reference frame i, the product of which is represented as $S_{disti}$.

With the sensor 112 and the transmitter 114 at the second reference frame i, a third measurement is obtained by the sensor 112. In particular, the coils of the transmitter 114 are configured to generate a third plurality of magnetic fields at the first frequency (e.g., in the first mode that uses the frequency at which the EMT system 100, AR, and/or VR systems are configured to operate under normal operating conditions). As described above, in some implementations, the first frequency is one that may be susceptible to inaccuracies due to potential distorters in the tracking environment 106.

A third plurality of signals is received from the sensor 112. For example, the sensor 112 is configured to generate signals based on characteristics of the magnetic fields received at the sensor 112. The magnetic fields received at the sensor 112 may be largely based on the magnetic fields generated by the transmitter 114 at the third frequency. However, one or more potential distorters in the tracking environment 106, among other things, may cause the generated magnetic fields to "bend" from their normal geometry. Such distortions may cause the third plurality of signals received from the sensor 112 to provide an incorrect P&O of the sensor 112 relative to the transmitter 114 at the second reference frame i. The third plurality of signals can be represented as a third 3×3 S-matrix of data, referred to herein as $S_{rec_i}$. For example, $S_{rec_i}$ is received while the sensor 112 and transmitter 114 are at the second reference frame S P&O$_i$ and T P&O$_i$ and the transmitter 114 generates magnetic fields at the third frequency.

Based on the third 3×3 S-matrix of data (e.g., $S_{rec_i}$), and based on the distortion term at the second reference frame i, (e.g., $S_{dist_i}$), an undistorted term, $S_{clean_i}$, is determined. In particular, $S_{clean_i}$ is determined according to Equation (4):

$$S_{clean_i} = S_{rec_i} - R_s R_{z_o}^T (S_{rec_o} - S_{clean_o}) R_{t_o} R_{t_i}^T \qquad (4)$$

where the undistorted term, $S_{clean_i}$, is an S-matrix that is representative of an accurate (e.g., true, correct, actual, etc.) P&O of the sensor 112 when the sensor 112 is at the second reference frame i (e.g., at S P&Oi and T P&Oi, which correspond to the second position and orientation of the sensor 112 and the second position and orientation of the transmitter 114). In other words, the third 3×3 S-matrix of data, $S_{rec_i}$, may include distortions due to presence of one or more conductive or magnetic objects at or near the tracking environment 106 of the EMT system 100, and if a P&O of the sensor 112 were calculated based on $S_{rec_i}$, the P&O may include inaccuracies in one or more dimensions. As such, the distortion term at the second reference frame, $S_{dist_i}$, is subtracted from $S_{rec_i}$ to produce a calculated S-matrix that can be resolved into an accurate P&O for the sensor 112 in the second reference frame (e.g., at the second P&O). In this way, the calculated second P&O of the sensor 112 does not include inaccuracies that would otherwise be caused by distortions in $S_{rec_i}$ due to presence of one or more conductive or magnetic objects at or near the tracking environment 106 if the undistorted term, $S_{clean_i}$, were not considered.

In some implementations, as the sensor 112 and/or transmitter 114 move within the tracking environment 106 (e.g., relative to the initial, 0, and second, i, reference frames), the initial distortion term, $S_{dist_0}$, may be of minimal use at the subsequent position. For example, characteristics of the tracking environment 106 at subsequent positions may be significantly different than those at the initial reference frame (e.g., due to a relatively high distortion gradient), and as such, the initial distortion term, $S_{dist_0}$, obtained at the initial reference frame may not be representative of distortion that are present at the subsequent positions. As such, additional distortion terms that correspond to various positions of the sensor 112 and/or transmitter 114 within the tracking environment 106 can be obtained. Such distortion terms can be obtained for various reference frames that correspond to a position and/or orientation of the sensor 112 and/or a position and/or orientation of the transmitter 114. In some implementations, a distortion term can be obtained for a particular sensor 112/transmitter 114 P&O when the sensor 112 and transmitter 114 temporarily cease movement during use.

The implementations described above are directed to techniques for determining a clean pose of the sensor 112 based on undistorted measurements obtained with the assistance of a low-frequency operating mode and/or an optical system that are not susceptible to environmental distortions. The distorted and undistorted measurements at an initial location are used to determine a distortion term at the initial location, and the distortion term is used to correct a distorted measurement when the sensor 112 is at a subsequent location. The distortion term is determined around the same time that the pose of the sensor 112 is being determined. However, in some implementations, distortion terms corresponding to various locations within the tracking environment 106 can be determined ahead of time. For example, a map of environmental distortions throughout the tracking environment 106 can be created. The map can be acquired as part of an initialization routine, or may be initiated by a user at a later time upon software command. When a true pose of the sensor 112 is to be determined, a previously obtained distortion term that corresponds to the location of the sensor 112 can be used to compute a clean pose of the sensor 112. In this way, distortion terms need not be determined in real time.

To map the tracking environment 106, the transmitter 114 may be situated at a fixed location at or near the tracking environment 106. The sensor 112 is then moved (e.g., slowly) throughout the tracking environment 106. The sensor 112 may be moved manually (e.g., by a user) or mechanically (e.g., according to a predetermined path within the tracking environment 106, for example, by a robotic arm). By way of non-limiting example, the sensor 112 can move in a roughly circular path horizontally (e.g., co-planar) around the transmitter 114. The sensor 112 can be moved around the transmitter 114 at different radii on different parallel planes in space. As the sensor 112 is moved throughout the tracking environment 106, distorted pose sensor outputs ($S_{rec_0}$) are determined and saved for the various positions. At the same time, clean pose outputs ($S_{clean_0}$) are determined (e.g., using an optical system and/or a low-frequency operating mode). In this way, the clean pose of the sensor 112 is determined for the various locations at which the distorted pose sensor outputs are obtained, and corresponding distortion terms ($S_{dist_0}$) are correlated to the various clean poses. In this way, distortion data for the entire tracking volume may be taken, given a sufficient spacing of samples.

The system 100 can then produces one or more low bandwidth surface distortion maps having relatively low distortion gradients. For example, the system 100 produces a surface curve fit of the distortion terms $S_{dist_0}$ (e.g., the distortion matrices) using a low-order curve-fit function, for example a surface least-square fit (or other surface curve-fit). The process is repeated for various distortion matrix surfaces. In this way, the entire tracking volume (or, e.g., substantially the entire tracking volume) can be mapped to clean pose locations. In other words, the surface curve fit can be used to map substantially all of the tracking volume even though every location within the tracking volume may not necessarily have been sampled to determine a distortion term. The mapping data can be stored by the system 100 for later use, as described in more detail below.

Following the mapping, the surface maps can be used for environmental distortion correction. In particular, when the clean pose of the sensor 112 is to be determined, the system 100 can identify a distortion term that corresponds to a pose of the sensor 112 and use the distortion term to correct the distorted pose sensor outputs. For example, the system 100 first produces a sample of a clean pose output ($S_{clean0}$) at an initial sampled location in the tracking environment 106. The clean pose output $S_{clean0}$ can be determined as described above using an optical system and/or a low-frequency operating mode. The system 100 then correlates the initial clean pose output $S_{clean0}$ to a particular location (e.g., a nearest location) in the environmental distortion map (e.g., within a tolerance) to select a matching initial distortion term $S_{dist0}$. When the sensor 112 is subsequently positioned at a new pose, a distorted pose sensor output $S_{reci}$ measurement is made. Using, e.g., Equation 3, a nominal distortion at the current pose is calculated. Then, using, e.g., Equation 4, the clean pose output of the sensor 112 at the current pose ($S_{cleani}$) is calculated. The clean pose output ($S_{cleani}$) can then be correlated to the particular location in the environmental distortion map (e.g., within a tolerance) to select the next matching distortion term in the global reference frame, and the process repeats to determine the pose of the sensor 112 at a subsequent position.

In some implementations (e.g., if the tracking volume is sufficiently mapped), the clean pose output of the sensor 112 at the current pose can be calculated using a distortion term that corresponds to the current pose. In other words, it may not be necessary to use the initial distortion term $S_{dist0}$ to calculate the distortion term that corresponds to the current pose $S_{disti}$ using Equation 3, but rather, the clean pose output ($S_{cleani}$) can be calculated directly using the distortion term at the current pose $S_{disti}$ as obtained from the mapping.

In some implementations, the various distortion terms (e.g., "initial" distortion terms obtained while the transmitter 112 and sensor 114 have stopped moving, as well as other distortion terms calculated based on "initial" distortion terms) and/or the distortion maps described above can be stored by the one or more computer system and/or by a database (e.g., a remote database) in communication with the one or more computer systems. In some implementations, the various distortion terms can together be used to build a distortion map of a particular tracking environment (e.g., the tracking environment 106 of FIGS. 1-3). Distortion terms obtained for particular P&O of the sensor 112 and a particular P&O of the transmitter 114 can provide a data point for building the map.

Stored distortion terms that correspond to particular P&O of the sensor 112 and transmitter 114 can be useful if, at a later time, the sensor 112 and transmitter 114 subsequently return to the previously-determined P&O. For example, the stored distortion term for a particular P&O of the sensor 112 and transmitter 114 can again be used when the sensor 112 and transmitter 114 return to the same or similar P&O. Such distortion terms can be re-used when the characteristics of the tracking environment 106 have not changed over time. In some implementations (e.g., when the EMT sensor 100 is moved to a new location, and/or when conductive objects are added/removed from the tracking environment 106 or from areas proximate to the tracking environment 106), the tracking environment 106 may be re-mapped to correspond to new distorters that may be present at or near the new tracking environment 106.

In some implementation, the distortion terms may be used to create a numerical model of distortions in the tracking environment 106 in order to infer distortion terms that correspond to non-sampled P&O of the sensor 112 and transmitter 114. For example, an initial distortion map may be created based on an initial set of distortion terms obtained for the tracking environment 106. Based on the sampled distortion terms, other distortion terms may be inferred for positions and orientations within the tracking environment 106 that were not specifically sampled (e.g., positions and orientations near sampled positions and orientations). Additional distortion terms can be added to the distortion map to improve its reliability. As the additional distortion terms are added, the numerical model of distortions in the tracking environment 106 can be updated to reflect the additional data points that are available. Over time, the numerical model can be improved such that the EMT system 100 can provide P&O information for the sensor 112 having improved accuracy. In some implementations, an accurate P&O of the sensor 112 may be provided without necessarily obtaining a new initial distortion term (e.g., when the sensor 112 and transmitter 114 temporarily cease movement). For example, a stored distortion term may be used to correct the P&O of the sensor 112 on-the-fly based on the numerical model of the tracking environment 106.

Figure 4:
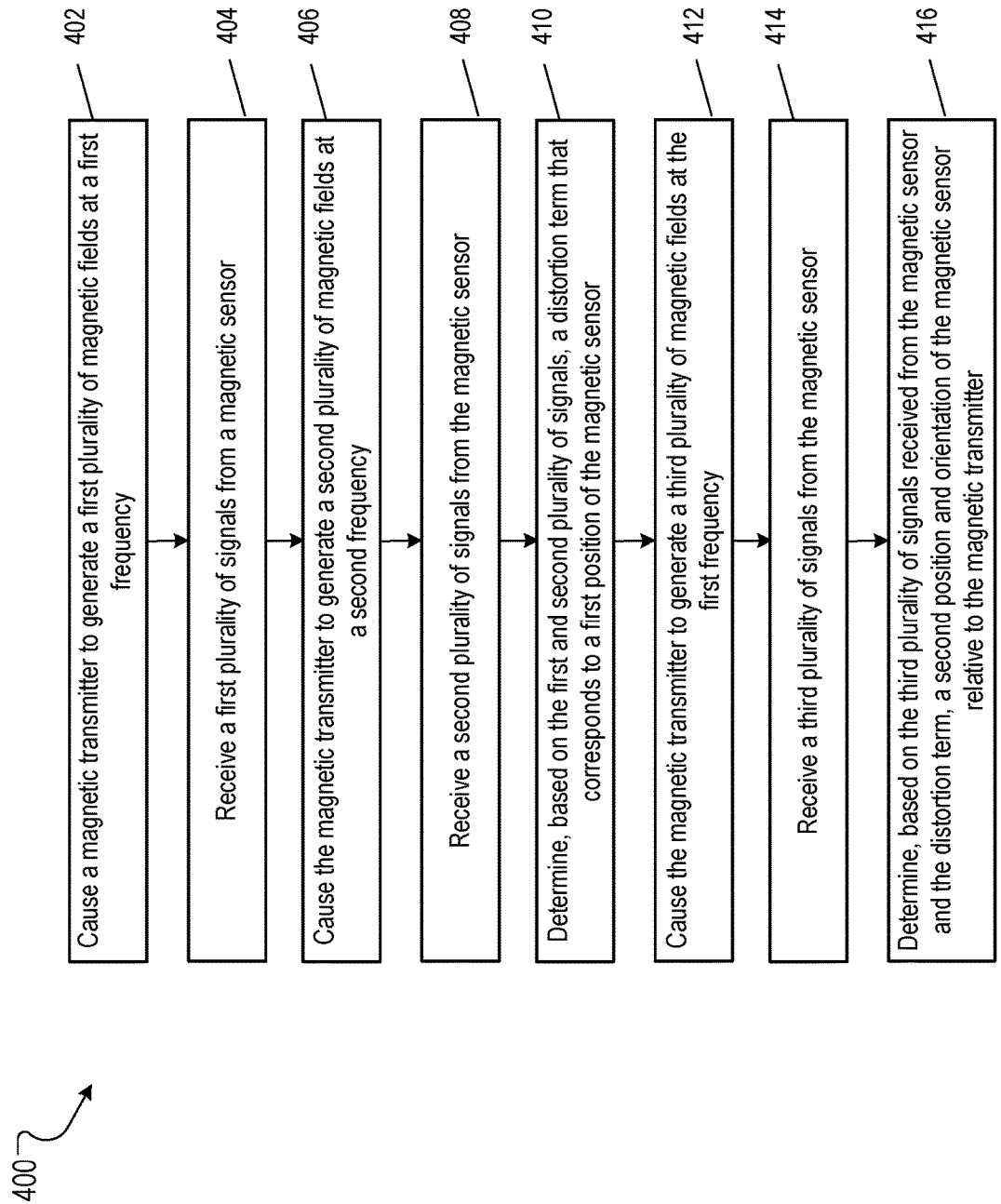
FIG. 4 shows a flowchart of an exemplary process of determining a distortion term and determining a second position of a sensor relative to a transmitter.

FIG. 4 is a flowchart of an exemplary process 400 of determining a distortion term and determining a second (e.g., correct) position of a magnetic sensor relative to a magnetic transmitter (e.g., the magnetic sensor 112 and the magnetic transmitter 114 of the EMT system 100 of FIGS. 1-3). One or more steps of the method may be performed by the one or more computer systems described herein.

At step 402, a magnetic transmitter 114 generates a first plurality of magnetic fields at a first frequency. The first frequency may be a frequency at which the EMT system 100 is configured to operate under normal operating conditions (e.g., during typical use of the EMT system 100 and/or the AR and/or VR system). In some implementations, the first frequency may be used when the EMT system 100 is operating in a first/normal mode of operations. In some implementations, the first frequency is one that may be susceptible to inaccuracies due to potential distorters in the tracking environment 106. For example, the first frequency is 30 KHz or more (e.g., 30 KHz).

At step 404, a first plurality of signals are received from the magnetic sensor 112. The signals are based on characteristics of the magnetic fields received at the magnetic sensor 112. While the magnetic fields received at the magnetic sensor 112 may be largely based on the first plurality of magnetic fields generated by the magnetic transmitter 114 at the first frequency, potential distorters in the tracking environment 106 may cause the first plurality of signals to provide an incorrect P&O of the magnetic sensor 112 relative to the magnetic transmitter 114. The first plurality of signals can be represented as a first 3×3 S-matrix of data, $S_{rec0}$. For example, $S_{rec0}$ is received while the magnetic sensor 112 and the magnetic transmitter 114 are at an initial reference frame 0 (e.g., S P&O$_0$ and T P&O$_0$) and while the magnetic transmitter 114 generates the first plurality of magnetic fields at the first frequency.

At step 406, for example, with the magnetic sensor 112 and the magnetic transmitter 114 still at or close to the initial reference frame 0, the magnetic transmitter 114 generates a second plurality of magnetic fields at a second frequency. The second frequency may be a frequency at which the EMT system 100, AR, and/or VR systems are configured to operate under a specialized operating condition (e.g., while the magnetic sensor 112 and the magnetic transmitter 114 are stationary or almost stationary, for example, while a user of the EMT system 100 temporarily stops moving). In some implementations, the second frequency may be used when the EMT system 100 is operating in a second/undistorted mode of operation. In some implementations, the second frequency is one that is unsusceptible (or, e.g., significantly less susceptible than the first frequency) to inaccuracies due to potential distorters in the tracking environment 106. For example, the second frequency may be a frequency of 1.1 KHz or less (e.g., 100 Hz). The second frequency is typically less than the first frequency (e.g., significantly less). For example, the first frequency may be two order of magnitude (or more) greater than the second frequency.

At step 408, a second plurality of signals are received from the magnetic sensor 112. The signals are based on characteristics of the magnetic fields received at the magnetic sensor 112. The magnetic fields received at the magnetic sensor 112 may be largely based on the second plurality of magnetic fields generated by the magnetic transmitter 114 at the second frequency. Any potential distorters in the tracking environment 106 may have a limited impact on the second plurality of magnetic fields generated using the second frequency. As such, potential distorters may not cause (or, e.g., may cause to a significantly lesser extent) the second plurality of magnetic fields generated at the second frequency to "bend" from their normal geometry (e.g., as compared to the first plurality of magnetic fields generated at the first frequency). Therefore, the second plurality of signals received from the magnetic sensor 112 may provide an accurate P&O of the magnetic sensor 112 relative to the magnetic transmitter 114. The second plurality of signals can be represented as a second 3×3 S-matrix of data, $S_{clean0}$. For example, $S_{clean0}$ is received while the magnetic sensor 112 and the magnetic transmitter 114 are still at the initial reference frame 0 (e.g., S P&O$_0$ and T P&O$_0$) and while the magnetic transmitter 114 generates the second plurality of magnetic fields at the second frequency. $S_{clean0}$ is referred to as a "clean" S-matrix because it is assumed to accurately correspond to "clean" (e.g., undistorted) magnetic fields received at the magnetic sensor 112. In other words, $S_{clean0}$ theoretically represents the signals that would be provided by the magnetic sensor 112 in an environment that does not include any distortions. As such, it is expected that $S_{clean0}$ can be resolved into an accurate (e.g., true, correct, actual, etc.) P&O of the magnetic sensor 112 when the magnetic sensor 112 is at the initial reference frame 0.

In some implementations, $S_{clean0}$ may be determined based on optical data provided by an optical system, as described above. For example, $S_{clean0}$ can be determined using the low distortion tracker 132, which may be implemented as an optical system with one or more cameras. Rather than operating the sensor 112 and transmitter 114 in a low-frequency operating mode to determine the clean pose of the sensor 112, the optical system can be used to determine a clean, undistorted pose of the sensor 112 at the initial reference frame. The low distortion tracker 132 along with the sensor processing 142 and transmitter processing 144 can be used to represent the clean pose of the sensor 112 at the initial reference frame as a 3×3 matrix of data, as $S_{clean0}$.

At step 410, a distortion term is determined based on the first plurality of signals and the second plurality of signals received from the magnetic sensor 112. The distortion term corresponds to a first position of the magnetic sensor 112. For example, the distortion term corresponds to the initial reference frame 0 (e.g., while the magnetic sensor 112 and the magnetic transmitter 114 are at the first position and orientation corresponding to the initial reference frame S P&O$_0$, T P&O$_0$). In some implementations, the distortion term that corresponds to the initial reference frame 0 is determined at least in part by subtracting $S_{clean0}$ from $S_{rec0}$.

In some implementations, when the OMDs 122, 124 include IMUs, IMUs that correspond to the magnetic sensor 112 and the magnetic transmitter 114 may provide inertial data while the magnetic sensor 112 and the magnetic transmitter 114 are at the initial reference frame 0. Such inertial data can be used to determine an orientation of the magnetic sensor 112 and the magnetic transmitter 114 at the initial reference frame 0. In some implementations, the orientations as determined based on the inertial data may be taken as accurate orientation data (e.g., the true orientation of the magnetic sensor 112 and the magnetic transmitter 114). The orientation data may be provided to the one or more computer systems (e.g., to the EM transmitter processing and/or the EM sensor processing and/or a separate computer system). In some implementations, the OMDs 122, 124 may include an optical system that is used to determine the orientation of the sensor 112 and/or the transmitter 114

In some implementation, data indicative of the orientation of the magnetic sensor 112 at the initial reference frame, $R_{s0}$, and data indicative of the orientation of the magnetic transmitter 114 at the initial reference frame, $R_{t0}$, is used to rotate the difference between $S_{rec0}$ and $S_{clean0}$ into the initial reference frame 0. In particular, the difference between $S_{rec0}$ and $S_{clean0}$ are rotated into the initial reference frame 0 by multiplying the difference by $R_{s0}$ and $R_{t0}$.

Once the difference is rotated into the initial reference frame 0 (or, e.g., one the difference is confirmed to be in the initial reference frame 0), the distortion term that corresponds to the initial reference frame 0 is given as $S_{dist0}$.

In some implementation, the distortion term that corresponds to the initial reference frame, $S_{dist0}$, can be used to calculate a distortion term at a new reference frame (e.g., a second reference frame i). For example, the magnetic sensor 112 and/or the magnetic transmitter 114 may resume movement and move to a second position and second orientation that correspond to the second reference frame S P&Oi and T P&Oi, as illustrated in FIG. 3. The initial distortion term, $S_{dist0}$, can be rotated into the second reference frame i according to Equation (3) above. In particular, inertial data indicative of the orientation of the magnetic sensor 112 at the second reference frame, $R_{si}$, and inertial data indicative of the orientation of the magnetic transmitter 114 at the second reference frame, $R_{ti}$, can be multiplied by the initial distortion term, $S_{dist0}$, in order to rotate the initial distortion term, $S_{dist0}$, into the second reference frame i. The product of this multiplication is $S_{disti}$, a distortion term that corresponds to the second frame i.

At step 412, the magnetic transmitter 114 generates a third plurality of magnetic fields at the first frequency (e.g., in the first mode of operation). The third plurality of magnetic fields may be generated by the magnetic transmitter 114 after the magnetic sensor 112 and/or the magnetic transmitter 114 have moved to the second reference frame i. For example, after the magnetic sensor 112 and/or the magnetic transmitter 114 move to the second position and second orientation that correspond to the second reference frame S P&O$_i$ and T P&O$_i$, the third plurality of magnetic fields are generated. As described above, in some implementations, the first frequency is one that may be susceptible to inaccuracies due to potential distorters in the tracking environment 106.

At step 414, a third plurality of signals are received from the magnetic sensor 112. The signals are based on characteristics of the magnetic fields received at the magnetic sensor 112. While the magnetic fields received at the magnetic sensor 112 may be largely based on the third plurality of magnetic fields generated by the magnetic transmitter 114 at the first frequency, potential distorters in the tracking environment 106 may cause the third plurality of signals to provide an incorrect P&O of the magnetic sensor 112 relative to the magnetic transmitter 114. The third plurality of signals can be represented as a third 3×3 S-matrix of data, $S_{reci}$. For example, $S_{reci}$ is received while the magnetic sensor 112 and the magnetic transmitter 114 are at the second reference frame i (e.g., S P&O$_i$ and T P&O$_i$) and while the magnetic transmitter 114 generates the third plurality of magnetic fields at the first frequency.

At step 416, the second position and orientation of the magnetic sensor 112 relative to the magnetic transmitter 114 (e.g., at the second reference frame i) are determined based on the third plurality of signals received from the magnetic sensor 112 and the distortion term. For example, the second position and orientation of the magnetic sensor 112 relative to the magnetic transmitter 114 are determined based on the third 3×3 S-matrix of data (e.g., $S_{reci}$), and based on the distortion term at the second reference frame i, (e.g., $S_{disti}$).

In some implementations, determining the second position and orientation of the magnetic sensor 112 relative to the magnetic transmitter 114 at the second reference frame i includes determining an undistorted term, $S_{cleani}$, which can be determined according to Equation (4) above. The undistorted term, $S_{cleani}$, is an S-matrix that is representative of an accurate (e.g., true, correct, actual, etc.) P&O of the magnetic sensor 112 when the magnetic sensor 112 is at the second reference frame i (e.g., at S P&Oi and T P&Oi, which correspond to the second position and orientation of the magnetic sensor 112 and the second position and orientation of the magnetic transmitter 114). In other words, the third 3×3 S-matrix of data, $S_{reci}$, may include distortions due to presence of one or more conductive or magnetic objects at or near the tracking environment 106 of the EMT system 100, and if a P&O of the magnetic sensor 112 were calculated based on $S_{reci}$, the P&O may include inaccuracies in one or more dimensions. As such, the distortion term at the second reference frame, $S_{disti}$, can be subtracted from $S_{reci}$ to produce a calculated S-matrix that can be resolved into an accurate P&O for the magnetic sensor 112 in the second reference frame (e.g., at the second P&O). In this way, the calculated second P&O of the magnetic sensor 112 does not include inaccuracies that would otherwise be caused by distortions in $S_{reci}$ due to presence of one or more conductive or magnetic objects at or near the tracking environment 106 if the undistorted term, $S_{cleani}$, were not considered.

In some implementations, distortion terms for various poses within the tracking environment 106 can be determined ahead of time as part of a mapping procedure, as described in more detail above. The distortion terms can be used to calculate undistorted terms for the sensor output when the sensor 112 is subsequently positioned.

Figure 5:
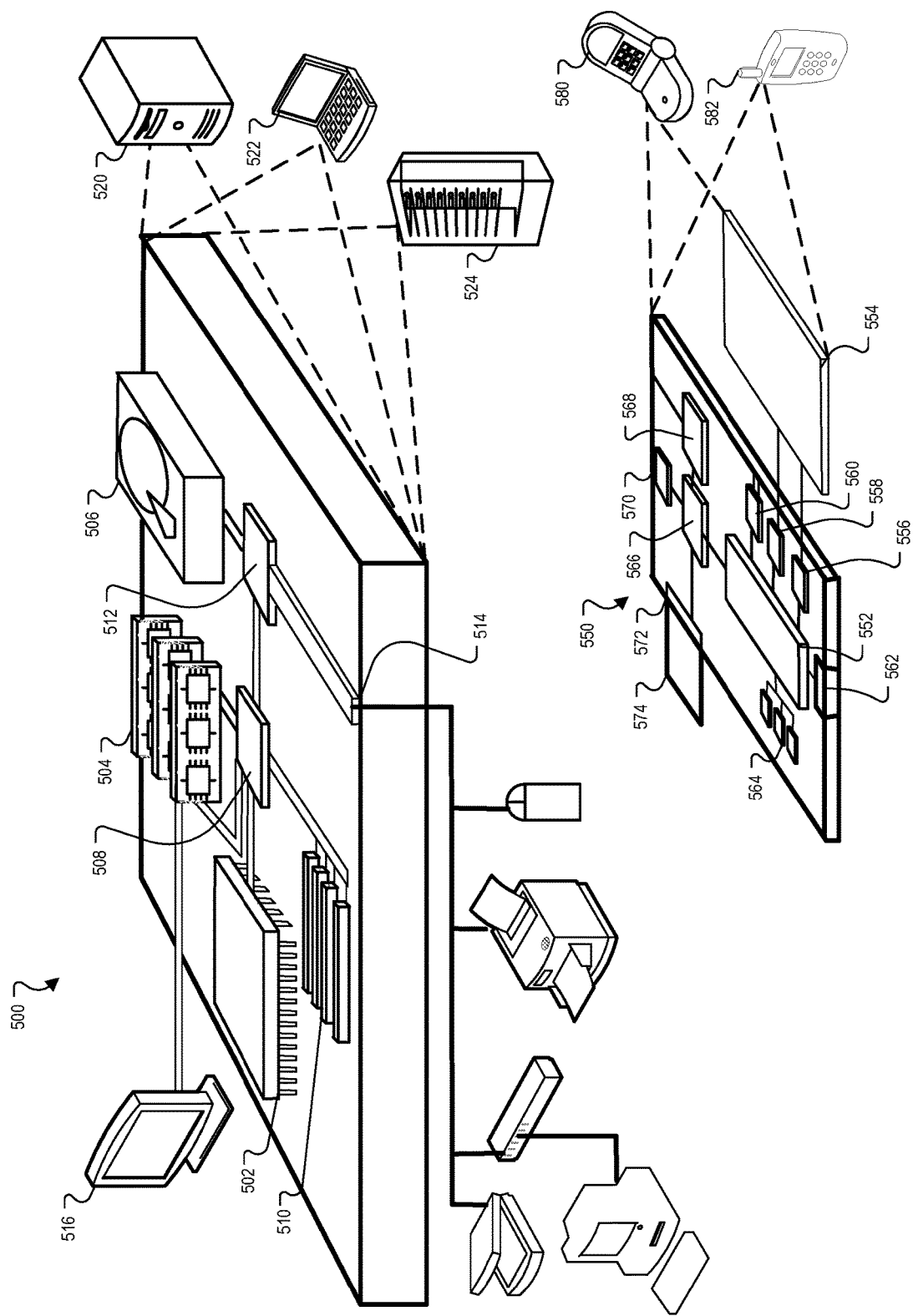
FIG. 5 shows an example of a computing device and a mobile computing device that can be used to implement the techniques described herein.

As described above, the EMT system 100 can be operated using software executed by a computing device, such as one or more computer systems operating on the HMD 102/sensor 112 and/or the controller 104/transmitter 114, and/or one or more separate computer system in communication with the sensor 112 and the transmitter 114. In some implementations, the software is included on a computer-readable medium for execution on the one or more computer systems. FIG. 5 shows an example computing device 500 and an example mobile computing device 550, which can be used to implement the techniques described herein. For example, determining and/or adjusting distortion terms and determining the P&O of the sensor 112 may be executed and controlled by the computing device 500 and/or the mobile computing device 550. Computing device 500 is intended to represent various forms of digital computers, including, e.g., laptops, desktops, workstations, personal digital assistants, servers, blade servers, mainframes, and other appropriate computers. Computing device 550 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes processor 502, memory 504, storage device 506, high-speed interface 508 connecting to memory 504 and high-speed expansion ports 510, and low speed interface 512 connecting to low speed bus 514 and storage device 506. Each of components 502, 504, 506, 508, 510, and 512, are interconnected using various busses, and can be mounted on a common motherboard or in other manners as appropriate. Processor 502 can process instructions for execution within computing device 500, including instructions stored in memory 504 or on storage device 506, to display graphical data for a GUI on an external input/output device, including, e.g., display 516 coupled to high-speed interface 508. In some implementations, multiple processors and/or multiple buses can be used, as appropriate, along with multiple memories and types of memory. In addition, multiple computing devices 500 can be connected, with each device providing portions of the necessary operations (e.g., as a server bank, a group of blade servers, a multi-processor system, etc.).

Memory 504 stores data within computing device 500. In some implementations, memory 504 is a volatile memory unit or units. In some implementation, memory 504 is a non-volatile memory unit or units. Memory 504 also can be another form of computer-readable medium, including, e.g., a magnetic or optical disk.

Storage device 506 is capable of providing mass storage for computing device 500. In some implementations, storage device 506 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above with respect to determining and/or adjusting distortion terms and determining the P&O of the sensor 112. The data carrier is a computer- or machine-readable medium, including, e.g., memory 504, storage device 506, memory on processor 502, and the like.

High-speed controller 508 manages bandwidth-intensive operations for computing device 500, while low speed controller 512 manages lower bandwidth-intensive operations. Such allocation of functions is an example only. In some implementations, high-speed controller 508 is coupled to memory 504, display 516 (e.g., through a graphics processor or accelerator), and to high-speed expansion ports 510, which can accept various expansion cards (not shown). In some implementations, the low-speed controller 512 is coupled to storage device 506 and low-speed expansion port 514. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 500 can be implemented in a number of different forms, as shown in FIG. 5. For example, the computing device 500 can be implemented as standard server 520, or multiple times in a group of such servers. The computing device 500 can also can be implemented as part of rack server system 524. In addition or as an alternative, the computing device 500 can be implemented in a personal computer (e.g., laptop computer 522). In some examples, components from computing device 500 can be combined with other components in a mobile device (e.g., the mobile computing device 550). Each of such devices can contain one or more of computing device 500, 550, and an entire system can be made up of multiple computing devices 500, 550 communicating with each other.

Computing device 550 includes processor 552, memory 564, and an input/output device including, e.g., display 554, communication interface 566, and transceiver 568, among other components. Device 550 also can be provided with a storage device, including, e.g., a microdrive or other device, to provide additional storage. Components 550, 552, 564, 554, 566, and 568, may each be interconnected using various buses, and several of the components can be mounted on a common motherboard or in other manners as appropriate.

Processor 552 can execute instructions within computing device 550, including instructions stored in memory 564. The processor 552 can be implemented as a chipset of chips that include separate and multiple analog and digital processors. The processor 552 can provide, for example, for the coordination of the other components of device 550, including, e.g., control of user interfaces, applications run by device 550, and wireless communication by device 550.

Processor 552 can communicate with a user through control interface 558 and display interface 556 coupled to display 554. Display 554 can be, for example, a TFT LCD (Thin-Film-Transistor Liquid Crystal Display) or an OLED (Organic Light Emitting Diode) display, or other appropriate display technology. Display interface 556 can comprise appropriate circuitry for driving display 554 to present graphical and other data to a user. Control interface 558 can receive commands from a user and convert them for submission to processor 552. In addition, external interface 562 can communicate with processor 542, so as to enable near area communication of device 550 with other devices. External interface 562 can provide, for example, for wired communication in some implementations, or for wireless communication in some implementations. Multiple interfaces also can be used.

Memory 564 stores data within computing device 550. Memory 564 can be implemented as one or more of a computer-readable medium or media, a volatile memory unit or units, or a non-volatile memory unit or units. Expansion memory 574 also can be provided and connected to device 550 through expansion interface 572, which can include, for example, a SIMM (Single In Line Memory Module) card interface. Such expansion memory 574 can provide extra storage space for device 550, and/or may store applications or other data for device 550. Specifically, expansion memory 574 can also include instructions to carry out or supplement the processes described above and can include secure data. Thus, for example, expansion memory 574 can be provided as a security module for device 550 and can be programmed with instructions that permit secure use of device 550. In addition, secure applications can be provided through the SIMM cards, along with additional data, including, e.g., placing identifying data on the SIMM card in a non-hackable manner.

The memory 564 can include, for example, flash memory and/or NVRAM memory, as discussed below. In some implementations, a computer program product is tangibly embodied in a data carrier. The computer program product contains instructions that, when executed, perform one or more methods, including, e.g., those described above with respect to determining and/or adjusting distortion terms and determining the P&O of the sensor 112. The data carrier is a computer- or machine-readable medium, including, e.g., memory 564, expansion memory 574, and/or memory on processor 552, which can be received, for example, over transceiver 568 or external interface 562.

Device 550 can communicate wirelessly through communication interface 566, which can include digital signal processing circuitry where necessary. Communication interface 566 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, including, e.g., using a Bluetooth®, WiFi, or other such transceiver (not shown). In addition, GPS (Global Positioning System) receiver module 570 can provide additional navigation- and location-related wireless data to device 550, which can be used as appropriate by applications running on device 550.

Device 550 also can communicate audibly using audio codec 560, which can receive spoken data from a user and convert it to usable digital data. Audio codec 560 can likewise generate audible sound for a user, including, e.g., through a speaker, e.g., in a handset of device 550. Such sound can include sound from voice telephone calls, recorded sound (e.g., voice messages, music files, and the like) and also sound generated by applications operating on device 550.

Computing device 550 can be implemented in a number of different forms, as shown in FIG. 5. For example, the computing device 550 can be implemented as cellular telephone 580. The computing device 550 also can be implemented as part of smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions. In some implementations, the memory, storage devices, machine-readable medium and/or computer-readable medium is non-transitory.

To provide for interaction with a user, the systems and techniques described herein can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the components described herein can be separated, combined or incorporated into a single or combined component. The components depicted in the figures are not intended to limit the systems described herein to the software architectures shown in the figures.

A number of embodiments have been described. Nevertheless, it will be understood that various modifications may be made without departing from the spirit and scope of the disclosure. Accordingly, other embodiments are within the scope of the following claims.

What is claimed is:

1. A system comprising:
a magnetic transmitter configured to generate magnetic fields;
a magnetic sensor configured to generate signals based on characteristics of the magnetic fields received at the magnetic sensor; and
one or more computer systems configured to:
cause the magnetic transmitter to generate a first plurality of magnetic fields at a first frequency;
receive a first plurality of signals from the magnetic sensor;
determine data indicative of a position and orientation of the magnetic sensor at a first position of the magnetic sensor;
determine, based on the first plurality of signals and the data indicative of the position and orientation of the magnetic sensor at the first position, a distortion term that corresponds to a first position of the magnetic sensor;
cause the magnetic transmitter to generate a third plurality of magnetic fields at the first frequency;
receive a third plurality of signals from the magnetic sensor; and
determine, based on the third plurality of signals received from the magnetic sensor and the distortion term, a second position and orientation of the magnetic sensor relative to the magnetic transmitter.

2. The system of claim 1, wherein determining data indicative of a position and orientation of the magnetic sensor at a first position of the magnetic sensor comprises:
causing the magnetic transmitter to generate a second plurality of magnetic fields at a second frequency; and
receiving a second plurality of signals from the magnetic sensor.

3. The system of claim 1, wherein determining data indicative of a position and orientation of the magnetic sensor at a first position of the magnetic sensor comprises:
obtaining optical data related to the position and orientation of the magnetic sensor at a first position using an optical system; and
determining the data indicative of the position and orientation of the magnetic sensor at the first position based on the optical data.

4. The system of claim 2, wherein the first and second plurality of magnetic fields are generated when the magnetic transmitter remains at a first position and a first orientation, and the first and second plurality of signals are generated by the magnetic sensor while the magnetic sensor remains at the first position and a first orientation.

5. The system of claim 2, wherein the first plurality of signals is represented as a first 3×3 matrix of data, the second plurality of signals is represented as a second 3×3 matrix of data, and the distortion term is represented as a 3×3 matrix of data.

6. The system of claim 5, wherein the 3×3 matrix of data corresponding to the distortion term is calculated at least in part by subtracting the second 3×3 matrix of data from the first 3×3 matrix of data.

7. The system of claim 6, wherein the magnetic transmitter and the magnetic sensor are each associated with an inertial measurement unit (IMU) configured to provide inertial data.

8. The system of claim 7, wherein the 3×3 matrix of data corresponding to the distortion term is calculated at least in part by multiplying the difference between the first 3×3 matrix of data and the second 3×3 matrix of data by inertial data of the magnetic transmitter and inertial data of the magnetic sensor obtained while the magnetic transmitter remains at a first position and a first orientation and the magnetic sensor remains at the first position and a first orientation.

9. The system of claim 8, wherein multiplying the difference between the first 3×3 matrix of data and the second 3×3 matrix of data by the inertial data while the magnetic transmitter and the magnetic sensor remain at their respective first positions and orientations results in the 3×3 matrix of data corresponding to the distortion term to be rotated into an initial reference frame that corresponds to the first orientation of the magnetic transmitter and the first orientation of the magnetic sensor.

10. The system of claim 9, wherein the 3×3 matrix of data corresponding to the distortion term at the initial reference frame is multiplied by inertial data of the magnetic transmitter and inertial data of the magnetic sensor obtained when the magnetic transmitter is at a second position and a second orientation and the magnetic sensor is at the second position and the second orientation to obtain a distortion term at a second reference frame, wherein the distortion term at the second reference frame is represented as a 3×3 matrix of data.

11. The system of claim 10, wherein multiplying the 3×3 matrix of data corresponding to the distortion term at the initial reference frame by the inertial data obtained when the magnetic transmitter and the magnetic sensor are at their respective second positions and orientations results in the 3×3 matrix of data corresponding to the distortion term at the initial reference frame to be rotated into the second reference frame, wherein the 3×3 matrix of data corresponding to the distortion term at the second reference frame corresponds to the second orientation of the magnetic transmitter and the second orientation of the magnetic sensor.

12. The system of claim 11, wherein the third plurality of signals is represented as a third 3×3 matrix of data, and the third 3×3 matrix of data corresponds to the second reference frame.

13. The system of claim 12, wherein the third plurality of signals include distortions due to presence of one or more conductive or magnetic objects at or near a tracking environment of the system, and a third position and orientation of the magnetic sensor relative to the magnetic transmitter that corresponds to the third plurality of signals includes inaccuracies in one or more dimensions.

14. The system of claim 12, wherein the one or more computer systems are further configured to:
  determine, based on the third 3×3 matrix of data corresponding to the second reference frame and the 3×3 matrix of data corresponding to the distortion term at the second reference frame, an undistorted term that corresponds to the second position and orientation of the magnetic sensor; and
  determine, based on the undistorted term, the second position and orientation of the magnetic sensor relative to the magnetic transmitter.

15. The system of claim 14, wherein the undistorted term is determined by subtracting the 3×3 matrix of data corresponding to the distortion term at the second reference frame from the third 3×3 matrix of data corresponding to the second reference frame.

16. The system of claim 15, wherein the undistorted term corresponds to a correct position and orientation of the magnetic sensor, and the second position and orientation of the magnetic sensor represent the correct position and orientation of the magnetic sensor.

17. The system of claim 16, wherein the second position and orientation of the magnetic sensor does not include inaccuracies that would otherwise be caused by distortions in the third plurality of signals due to presence of one or more conductive or magnetic objects at or near a tracking environment of the system if the undistorted term were not considered.

18. The system of claim 1, wherein the first frequency is greater than the second frequency, the first frequency is 30 KHz or greater, and the second frequency is 1.1 KHz or less.

19. A method comprising:
  causing a magnetic transmitter to generate a first plurality of magnetic fields at a first frequency;
  receiving, from a magnetic sensor, a first plurality of signals;
  determining data indicative of a position and orientation of the magnetic sensor at a first position of the magnetic sensor;
  determining, based on the first plurality of signals and the data indicative of the position and orientation of the magnetic sensor at the first position, a distortion term that corresponds to a first position of the magnetic sensor;
  causing the magnetic transmitter to generate a third plurality of magnetic fields at the first frequency;
  receiving, from the magnetic sensor, a third plurality of signals; and
  determining, based on the third plurality of signals received from the magnetic sensor and the distortion term, a second position and orientation of the magnetic sensor relative to the magnetic transmitter.

20. One or more non-transitory computer-readable media storing instructions operable to cause a computing device to perform operations comprising:
  causing a magnetic transmitter to generate a first plurality of magnetic fields at a first frequency;
  receiving, from a magnetic sensor, a first plurality of signals;
  determining data indicative of a position and orientation of the magnetic sensor at a first position of the magnetic sensor;
  determining, based on the first plurality of signals and the data indicative of the position and orientation of the magnetic sensor at the first position, a distortion term that corresponds to a first position of the magnetic sensor;
  causing the magnetic transmitter to generate a third plurality of magnetic fields at the first frequency;
  receiving, from the magnetic sensor, a third plurality of signals; and
  determining, based on the third plurality of signals received from the magnetic sensor and the distortion term, a second position and orientation of the magnetic sensor relative to the magnetic transmitter.

* * * * *